(12) United States Patent
Nguyen et al.

(10) Patent No.: US 10,839,831 B1
(45) Date of Patent: Nov. 17, 2020

(54) DUAL WRITER DESIGNS WITH SOT AND STT ASSISTED RECORDING

(71) Applicant: Western Digital Technologies, Inc., San Jose, CA (US)

(72) Inventors: Thao A. Nguyen, San Jose, CA (US); Michael Kuok San Ho, Redwood City, CA (US); Zhigang Bai, Fremont, CA (US); Zhanjie Li, Pleasanton, CA (US); Quang Le, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/730,758

(22) Filed: Dec. 30, 2019

(51) Int. Cl.
*G11B 5/23* (2006.01)
*G11B 5/31* (2006.01)
(Continued)

(52) U.S. Cl.
CPC ............ *G11B 5/3133* (2013.01); *G11B 5/115* (2013.01); *G11B 5/1877* (2013.01); *G11B 5/23* (2013.01);
(Continued)

(58) Field of Classification Search
None
See application file for complete search history.

(56) References Cited

U.S. PATENT DOCUMENTS 3,921,219 A * 11/1975 Lalesse ............... G11B 5/29 360/121
5,285,341 A * 2/1994 Suzuki ............... G11B 5/3103 360/121
(Continued)

FOREIGN PATENT DOCUMENTS

JP 61227209 A * 10/1986 ............... G11B 5/10
JP 4043438 B2 2/2008
(Continued)

OTHER PUBLICATIONS

Akitaya et al. "High Frequency Magnetic Recording Using a Dual Write Head," IEEE Transactions on Magnetics, vol. 52, No. 7, Jul. 2016, DOI: 10.1109/TMAG.2015.2512593 <https://doi.org/10.1109/TMAG.2015.2512593>.

(Continued)

*Primary Examiner* — William J Klimowicz
(74) *Attorney, Agent, or Firm* — Patterson & Sheridan, LLP; Steven H. Versteeg

(57) ABSTRACT

The present disclosure generally relates to a magnetic media drive employing a magnetic recording head. The magnetic recording head comprises a first write head and a second write head. The first write head comprises a first main pole, a first yoke having a first length, and a first coil wrapped around the first yoke. The second write head comprises a second main pole, a second yoke having a second length, a second coil wrapped around the second yoke, and a side shield surrounding two or more surfaces of the second main pole. The side shield comprises a heavy metal layer and a magnetic layer. The second write head comprises an energy-assisted magnetic recording element or stack. The second write head comprises a non-magnetic conductive structure to enable maximum current efficiency and uniformity. A write of the first write head is wider than that of the second write head.

23 Claims, 20 Drawing Sheets

(51) Int. Cl.
*G11B 5/115* (2006.01)
*G11B 5/187* (2006.01)
*G11B 5/00* (2006.01)

(52) U.S. Cl.
CPC .............. *G11B 5/314* (2013.01); *G11B 5/315* (2013.01); *G11B 2005/0021* (2013.01); *G11B 2005/0024* (2013.01)

(56) References Cited

U.S. PATENT DOCUMENTS

| | | | |
|---|---|---|---|
| 5,703,740 A | 12/1997 | Cohen et al. | |
| 5,835,313 A | 11/1998 | Sato et al. | |
| 5,883,760 A | 3/1999 | Yamada et al. | |
| 6,801,379 B2 | 10/2004 | Ozue et al. | |
| 7,116,516 B2 | 10/2006 | Dill et al. | |
| 7,430,098 B1 | 9/2008 | Song et al. | |
| 7,508,619 B2 | 3/2009 | Okamoto et al. | |
| 7,576,951 B2 | 8/2009 | Allen et al. | |
| 7,889,456 B2 | 2/2011 | Jiang et al. | |
| 7,982,996 B2 | 7/2011 | Smith et al. | |
| 8,116,031 B2 | 2/2012 | Alex et al. | |
| 8,310,782 B2 | 11/2012 | Song et al. | |
| 8,472,135 B1 | 6/2013 | Kusukawa et al. | |
| 8,634,163 B2 | 1/2014 | Tanabe et al. | |
| 8,848,317 B2 * | 9/2014 | Shiimoto | G11B 5/105 360/119.01 |
| 8,947,807 B2 | 2/2015 | Heim et al. | |
| 8,970,966 B2 | 3/2015 | Maetaki | |
| 9,355,655 B1 * | 5/2016 | Udo | G11B 5/1278 |
| 9,583,134 B2 | 2/2017 | Yamada et al. | |
| 9,626,990 B2 | 4/2017 | Tang et al. | |
| 9,640,205 B1 | 5/2017 | Kaizu et al. | |
| 9,773,517 B2 | 9/2017 | Gao et al. | |
| 9,805,744 B1 | 10/2017 | Xue et al. | |
| 9,842,614 B2 | 12/2017 | Hutchinson et al. | |
| 9,865,301 B1 | 1/2018 | Wiesen et al. | |
| 9,984,707 B2 | 5/2018 | Moore et al. | |
| 10,014,012 B1 | 7/2018 | Song et al. | |
| 10,157,632 B1 | 12/2018 | Song et al. | |
| 10,181,334 B1 | 1/2019 | Song et al. | |
| 10,210,888 B1 | 2/2019 | Li et al. | |
| 10,210,891 B1 | 2/2019 | Tian et al. | |
| 10,279,451 B1 | 5/2019 | Liu et al. | |
| 10,311,900 B1 | 6/2019 | Liu et al. | |
| 10,325,618 B1 * | 6/2019 | Wu | G11B 5/11 |
| 10,325,619 B2 * | 6/2019 | Wiesen | G11B 5/50 |
| 10,360,935 B1 | 7/2019 | Liu et al. | |
| 10,366,713 B1 | 7/2019 | Tang et al. | |
| 10,366,714 B1 | 7/2019 | Olson et al. | |
| 10,403,309 B2 * | 9/2019 | Li | G11B 5/1278 |
| 10,410,658 B1 * | 9/2019 | Liu | G11B 5/09 |
| 10,418,054 B1 | 9/2019 | Liu | |
| 10,482,905 B2 * | 11/2019 | Liu | G11B 5/1278 |
| 10,650,847 B2 * | 5/2020 | Li | G11B 5/3133 |
| 2004/0100731 A1 | 5/2004 | Sato | |
| 2004/0218306 A1 | 11/2004 | Sato et al. | |
| 2004/0246622 A1 | 12/2004 | Sato | |
| 2006/0126221 A1 | 6/2006 | Kobayashi et al. | |
| 2007/0041119 A1 | 2/2007 | Matsumoto et al. | |
| 2007/0258167 A1 | 11/2007 | Allen et al. | |
| 2007/0291409 A1 | 12/2007 | Sasaki et al. | |
| 2008/0186628 A1 | 8/2008 | Hsiao et al. | |
| 2009/0034121 A1 | 2/2009 | Ohta et al. | |
| 2009/0251821 A1 * | 10/2009 | Song | G11B 5/3116 360/110 |
| 2010/0007992 A1 | 1/2010 | Yamada et al. | |
| 2011/0051288 A1 | 3/2011 | Contreras et al. | |
| 2011/0205861 A1 | 8/2011 | Erden et al. | |
| 2012/0162821 A1 | 6/2012 | Lam et al. | |
| 2013/0170060 A1 | 7/2013 | Johns et al. | |
| 2014/0153134 A1 * | 6/2014 | Han | G11B 5/315 360/234.3 |
| 2016/0035374 A1 | 2/2016 | Takagishi et al. | |
| 2016/0148629 A1 * | 5/2016 | Gao | G11B 5/3116 360/64 |
| 2016/0148636 A1 | 5/2016 | Ma et al. | |
| 2017/0076742 A1 | 3/2017 | Tang et al. | |
| 2018/0082714 A1 | 3/2018 | Wiesen et al. | |
| 2019/0244634 A1 * | 8/2019 | Goncharov | G11B 5/315 |
| 2019/0279663 A1 * | 9/2019 | Song | G11B 5/315 |
| 2019/0279664 A1 | 9/2019 | Liu | |
| 2019/0304490 A1 | 10/2019 | Liu et al. | |
| 2019/0333531 A1 | 10/2019 | Liu et al. | |

FOREIGN PATENT DOCUMENTS

| | | |
|---|---|---|
| JP | 2010108533 A | 5/2010 |
| JP | 6145124 B2 | 6/2017 |

OTHER PUBLICATIONS

U.S. Appl. No. 16/453,991, filed Jun. 26, 2019.
U.S. Appl. No. 16/015,163, filed Jun. 21, 2018.
Zhu et al. "Microwave Assisted Magnetic Recording Utilizing Perpendicular Spin Torque Oscillator with Switchable Perpendicular Electrodes," IEEE Transactions on Magnetics, vol. 46, No. 3, Mar. 2000, pp. 751-757.
International Search Report and Written Opinion issued in corresponding Interntional Patent Application No. PCT/US2020/023596, dated Aug. 14, 2020 (14 pages).
International Search Report and Written Opinion issued in corresponding International Patent Application No. PCT/US2020/034721, dated Aug. 16, 2020 (10 pages).
International Search Report and Written Opinion issued in corresponding International Patent Application No. PCT/US2020/023679, dated Aug. 14, 2020 (12 pages).

* cited by examiner

DUAL WRITER DESIGNS WITH SOT AND STT ASSISTED RECORDING

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads in HDDs can have a significant effect on the overall performance and reliability of the recording device. Conventional magnetic recording heads utilize only one write head. The write head is either designed to increase a bits per inch (BPI) capability of the magnetic recording head by using a strong write field, or to increase a tracks per inch (TPI) capability of the magnetic recording head. The write head may further utilize energy-assisted magnetic recording (EAMR) by including an EAMR structure or stack disposed on a main pole of the write head. The EAMR stack includes at least one magnetic layer, such as a spin torque layer (STL) that is magnetized by a bias current during operation. The EAMR stack is often disposed between the trailing shield and the main pole to improve write field and/or field gradient, leading to a better areal density capacity (ADC).

Typical EAMR enabled magnetic recording devices further comprise one or more side shields surrounding the main pole. However, due to the charges coming off the main pole when a write current is applied to write to a media, adjacent tracks on the media may be erased. As such, the side shields are used for reducing the erasure in adjacent tracks and for further improving the TPI performance. On the other hand, the side shields cause magnetic shunting in the side gaps of the magnetic recording device, reducing the BPI of the magnetic recording devices.

Therefore, there is a need in the art for an improved magnetic recording head design.

SUMMARY OF THE DISCLOSURE

The present disclosure generally relates to a magnetic media drive employing a magnetic recording head. The magnetic recording head comprises a first write head and a second write head. The first write head comprises a first main pole, a first yoke having a first length, and a first coil wrapped around the first yoke. The second write head comprises a second main pole, a second yoke having a second length, a second coil wrapped around the second yoke, and a side shield surrounding two or more surfaces of the second main pole. The side shield comprises a heavy metal layer and a magnetic layer. The second write head comprises an energy-assisted magnetic recording element or stack. The second write head comprises a non-magnetic conductive structure to enable maximum current efficiency and uniformity. A write of the first write head is wider than that of the second write head.

In one embodiment, a magnetic recording head comprises a first write head comprising a first main pole, and a second write head disposed adjacent to the first write head. The second write head comprises a second main pole having a first surface adjacent to a trailing gap, a second surface adjacent to the first surface, a third surface opposite the second surface, and a fourth surface adjacent to a leading gap, a side shield surrounding one or more of the first surface, the second surface, the third surface, and the fourth surface of the second main pole, including at least one of the second surface and the third surface, wherein the side shield comprises a first layer comprising a heavy metal material or a topological insulator material and a second layer comprising a magnetic material, and an EAMR structure disposed on the second main pole at a media facing surface.

In another embodiment, a magnetic recording head comprises a first write head comprising a first main pole having a first length and a first width, and a second write head disposed adjacent to the first write head. The second write head comprises a second main pole having a second length and a second width, wherein the second length is greater than the first length of the first main pole and the second width is less than the first width of the first main pole. The magnetic recording head further comprises an EAMR structure disposed on the second main pole at a media facing surface, and a non-magnetic conductive structure surrounding at least a portion of the second main pole, wherein the non-magnetic conductive structure is in contact with the EAMR structure.

In yet another embodiment, a magnetic recording head comprises a first write head comprising a first main pole, a first yoke coupled to the first main pole, the first yoke having a first length, and a first coil wrapped around the first yoke. The magnetic recording head further comprises a second write head disposed adjacent to the first write head comprising a second main pole, an EAMR structure disposed on the second main pole at a media facing surface, a side shield surrounding a first surface, a second surface, and a third surface of the second main pole, a second yoke coupled to the second main pole, the second yoke having a second length equal to or less than the first length of the first yoke, and a second coil, wherein the first coil wraps around the first yoke a greater number of times than the second coil wraps around the second yoke.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a first write head and a second write head. The first write head comprises a first main pole, a first yoke having a first length, and a first coil wrapped around the first yoke. The second write head comprises a second main pole, a second yoke having a second length, a second coil wrapped around the second yoke, and a side shield surrounding two or more surfaces of the second main pole. The side shield comprises a heavy metal layer and a magnetic layer. The second write head comprises an energy-assisted magnetic recording element or stack. The second write head comprises a non-magnetic conductive structure to enable maximum current efficiency and uniformity. A write of the first write head is wider than that of the second write head.

Figure 1:
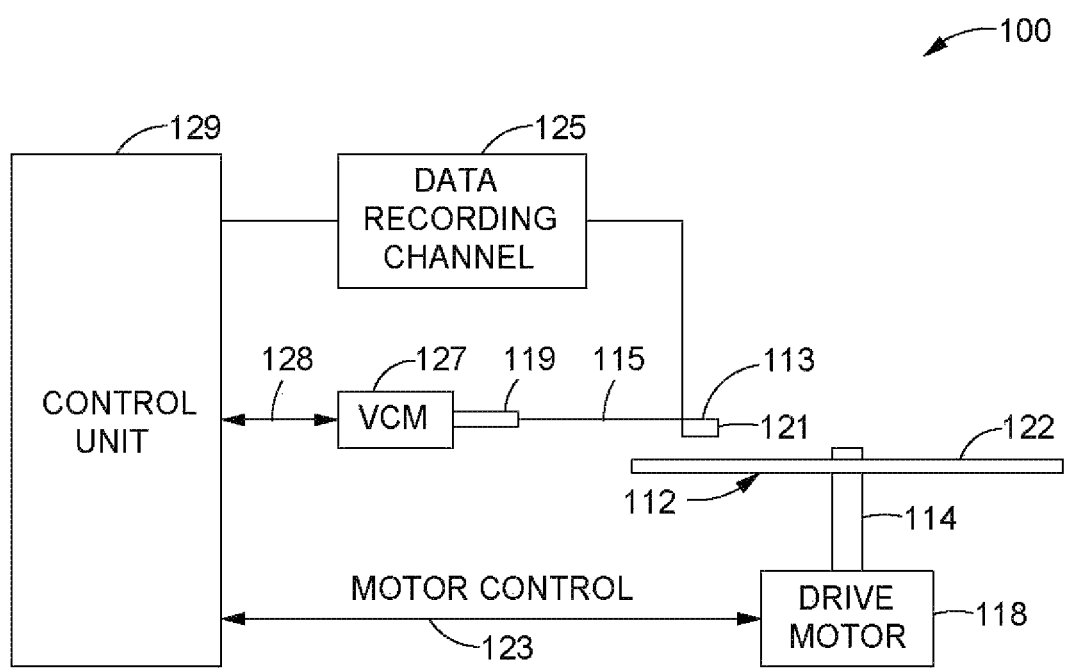
FIG. 1 illustrates a disk drive embodying various embodiments of this disclosure.

FIG. 1 illustrates a data storage device in the form of a disk drive 100 embodying various embodiments of this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit or controller 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The DC magnetic field generated from the magnetic head assembly 121 enhances the write-ability so that the write elements of the magnetic head assemblies 121 may correctly magnetize the data bits in the media 112.

The various components of the disk drive 100 are controlled in operation by control signals generated by control unit or controller 129, such as access control signals and internal clock signals. Typically, the control unit or controller 129 comprises logic control circuits, storage means, and a microprocessor. The control unit or controller 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
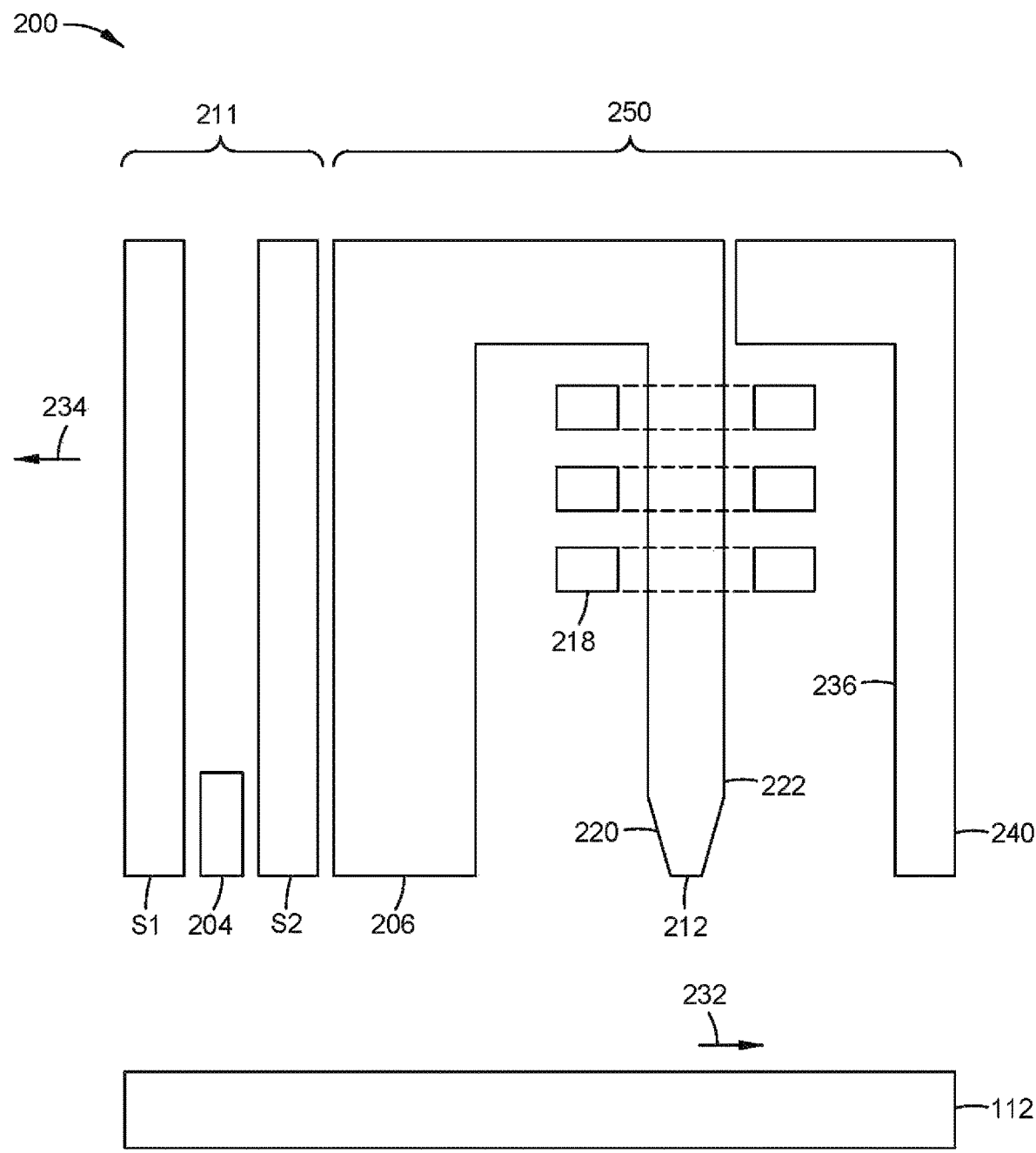
FIGS. 2A-2B illustrate fragmented, cross-sectional side views through the center of a read/write head facing a magnetic media, according to various embodiments.
Figure 2B:
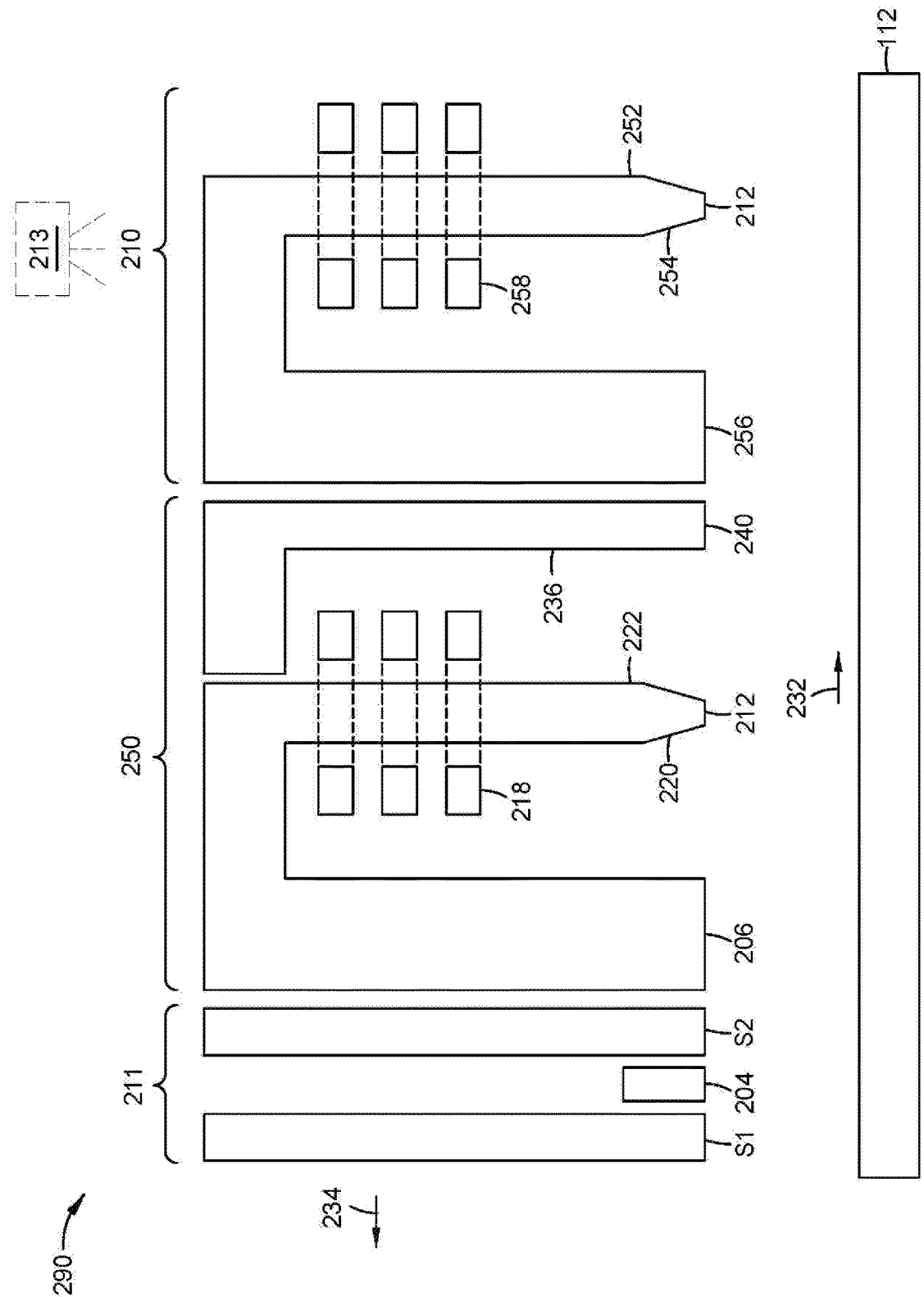

FIGS. 2A-2B illustrate fragmented, cross sectional side views through the center of read/write heads 200, 290, facing the magnetic media 112, respectively, according to various embodiments. The read/write heads 200, 290 may each correspond to the magnetic head assembly 121 described in FIG. 1. The read/write head 200 of FIG. 2A and the read/write head 290 of FIG. 2B are the same; however, the read/write head 200 of FIG. 2A comprises only one write head 250 while the read/write head 290 of FIG. 2B comprises two write heads 210, 250. The read/write head 200 of FIG. 2A may optionally include the first write head 210 disposed behind the write head 250, hidden from view.

The read/write head 200 of FIG. 2A includes a media facing surface (MFS) 212, such as an air bearing surface (ABS), a magnetic write head 250, and a magnetic read head 211, and is mounted such that the MFS 212 is facing the magnetic media 112. The read/write head 290 of FIG. 2B similarly includes a MFS 212, such as an ABS, a first magnetic write head 210, a second magnetic write head 250, and a magnetic read head 211, and is mounted such that the MFS 212 is facing the magnetic media 112. The write head 250 of FIG. 2A is the same as the second write head 250 of FIG. 2B. The read/write heads 200, 290 may each be an energy-assisted magnetic recording (EAMR) head. In one embodiment of FIG. 2B, the first write head 210 is a head assisted magnetic recording (HAMR) head and the second write head 250 is an energy-assisted magnetic recording head. For example, the first write head 210 may comprise a HAMR element 213, such as a light source or a laser (e.g., in the form of a near field transducer (NFT)). In such an embodiment, the HAMR element 213 or light source is coupled to a waveguide (not shown) disposed adjacent to the first main pole 254. In FIGS. 2A-2B, the magnetic media 112 moves past the first and/or second write heads 210, 250 in the direction indicated by the arrow 232 and the read/write heads 200, 290 each move in the direction indicated by the arrow 234. It is noted that, in various embodiments, the two write heads may be arranged in a different configuration than this down-track setup.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The first write head 210 of FIG. 2B includes a return pole 256, a first main pole 254, and a first coil 258 that excites the first main pole 254. The second write head 250 of FIGS. 2A-2B includes a return pole 206, a second main pole 220, a trailing shield 240, and a second coil 218 that excites the second main pole 220. A trailing gap (not shown) and a leading gap (not shown) may be in contact with at least the second main pole 220 of the second write head 250 and a leading shield (not shown) may be in contact with the leading gap. A recording magnetic field is generated from the first and/or second main poles 220, 254. The trailing shield 240 of the second write head 250 helps make the magnetic field gradient of the second main pole 220 steep. The second main pole 220 may include a trailing surface 222 which may be parallel to a leading surface 236 of the trailing shield 240. The first main pole 254 may also include a trailing surface 252. The trailing shield 240 may be a magnetic material such as NiFe alloy. In one embodiment, the trailing shield 240 has an Ms of about 1.2 T to about 2.0 T.

The first and/or second main poles 220, 254 may each comprise a magnetic material such as an FeCo alloy. The first and/or second main poles 220, 254 may each be a tapered write pole (TWP) with a trailing edge taper (TET) configuration. In one embodiment, the first and/or second main poles 220, 254 each have a saturated magnetization (Ms) of 2.35 T to about 2.4 T and a thickness between about 300 nanometers (nm). Each main pole 220, 254 may comprise ferromagnetic materials, typically alloys of one or more of Co, Fe, and Ni.

Figure 3A:
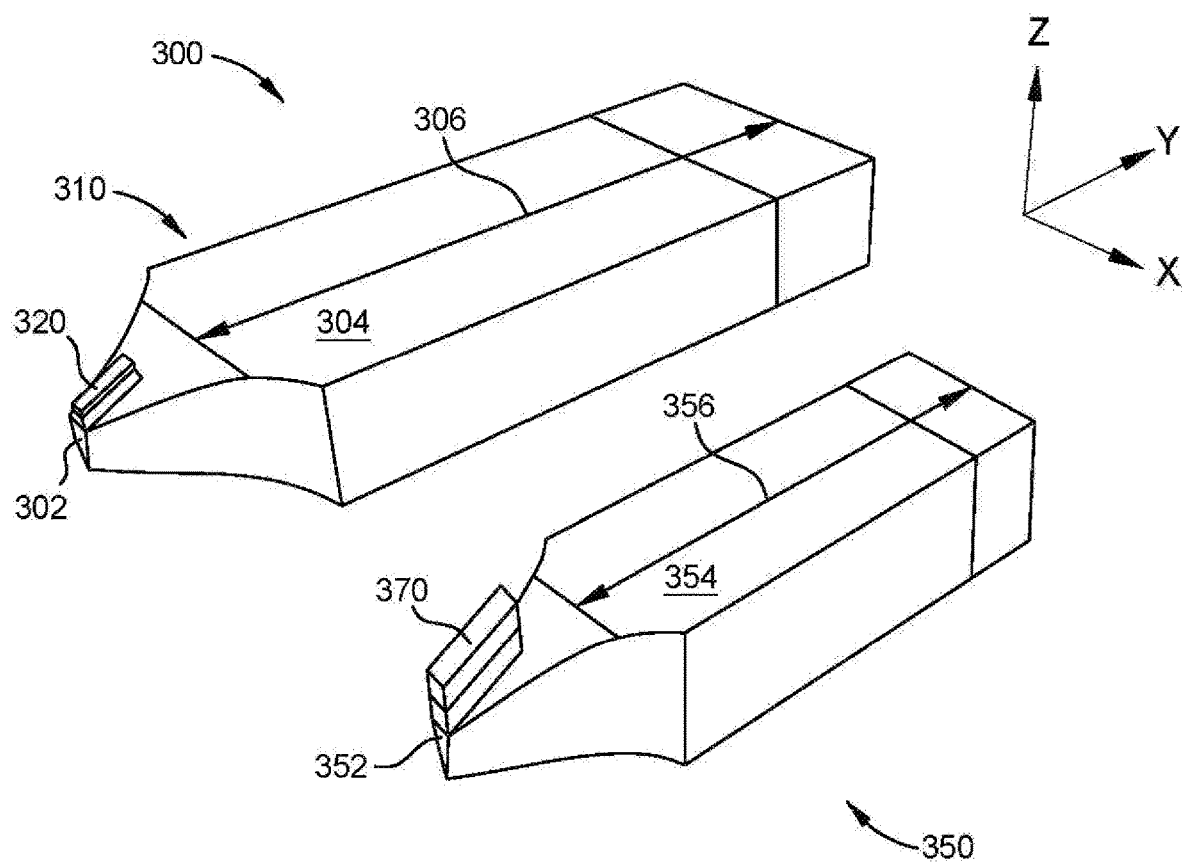
FIGS. 3A-3E illustrate a magnetic recording head comprising a first write head and a second write head, according to various embodiments.
Figure 3B:
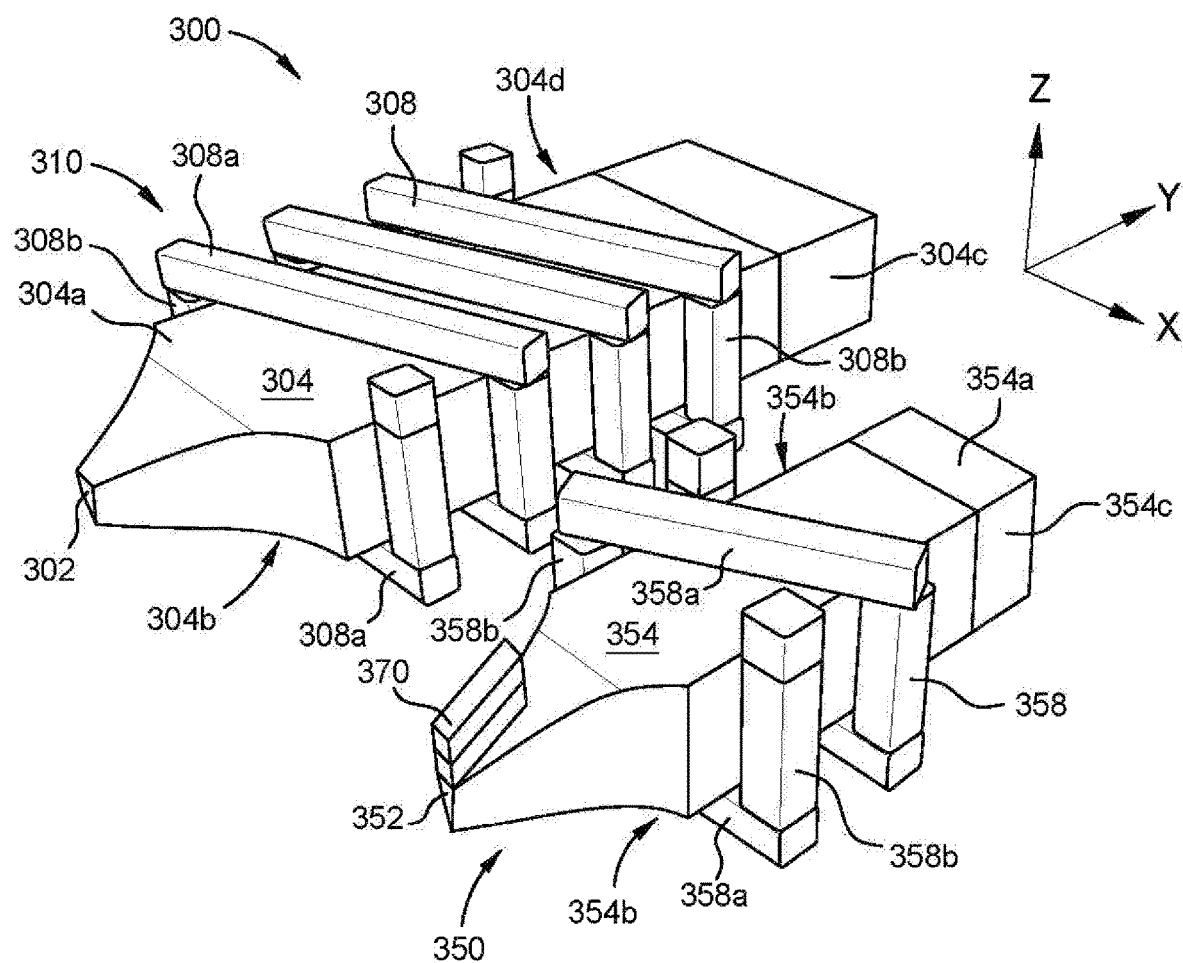
Figure 3C:
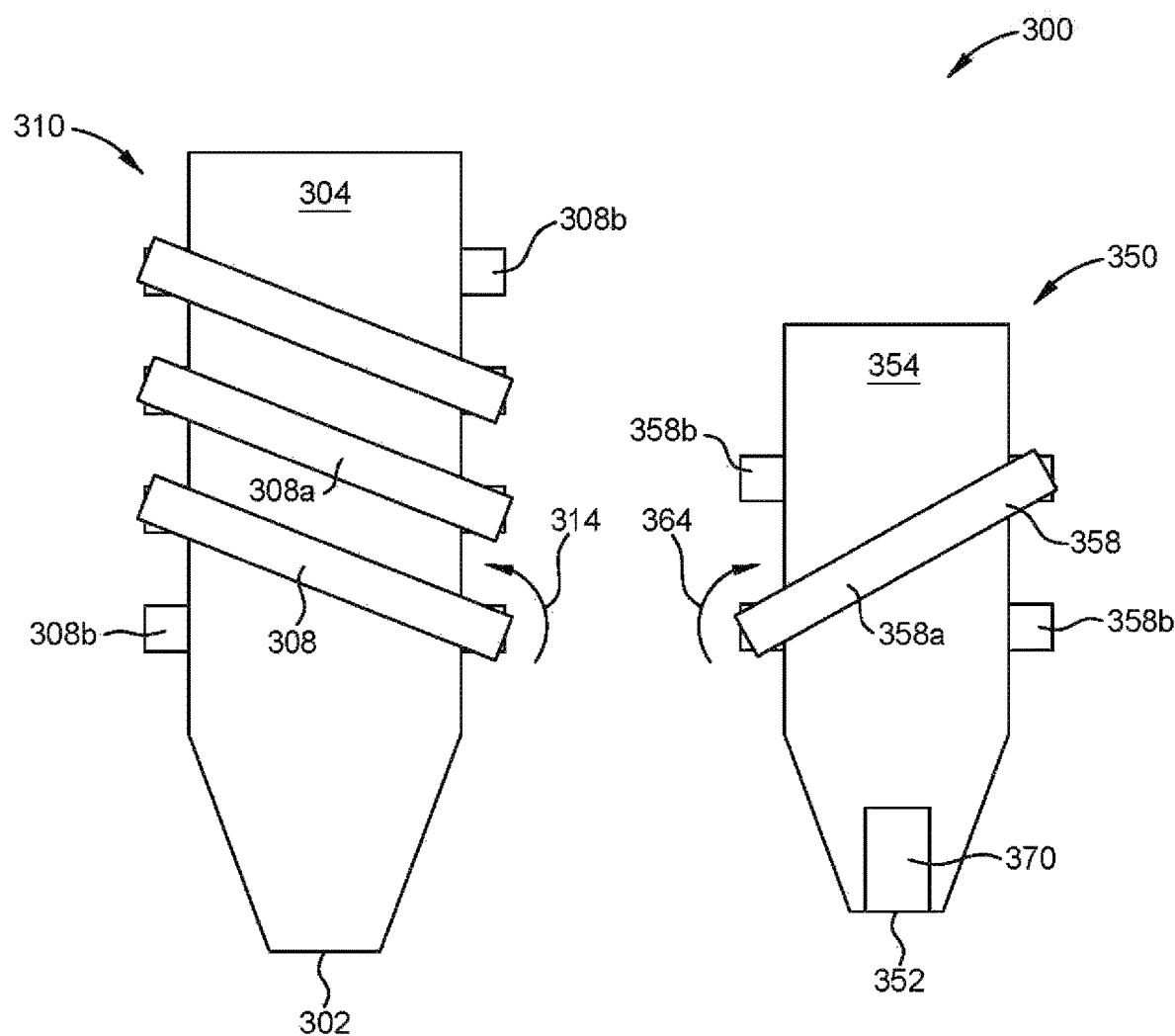
Figure 3D:
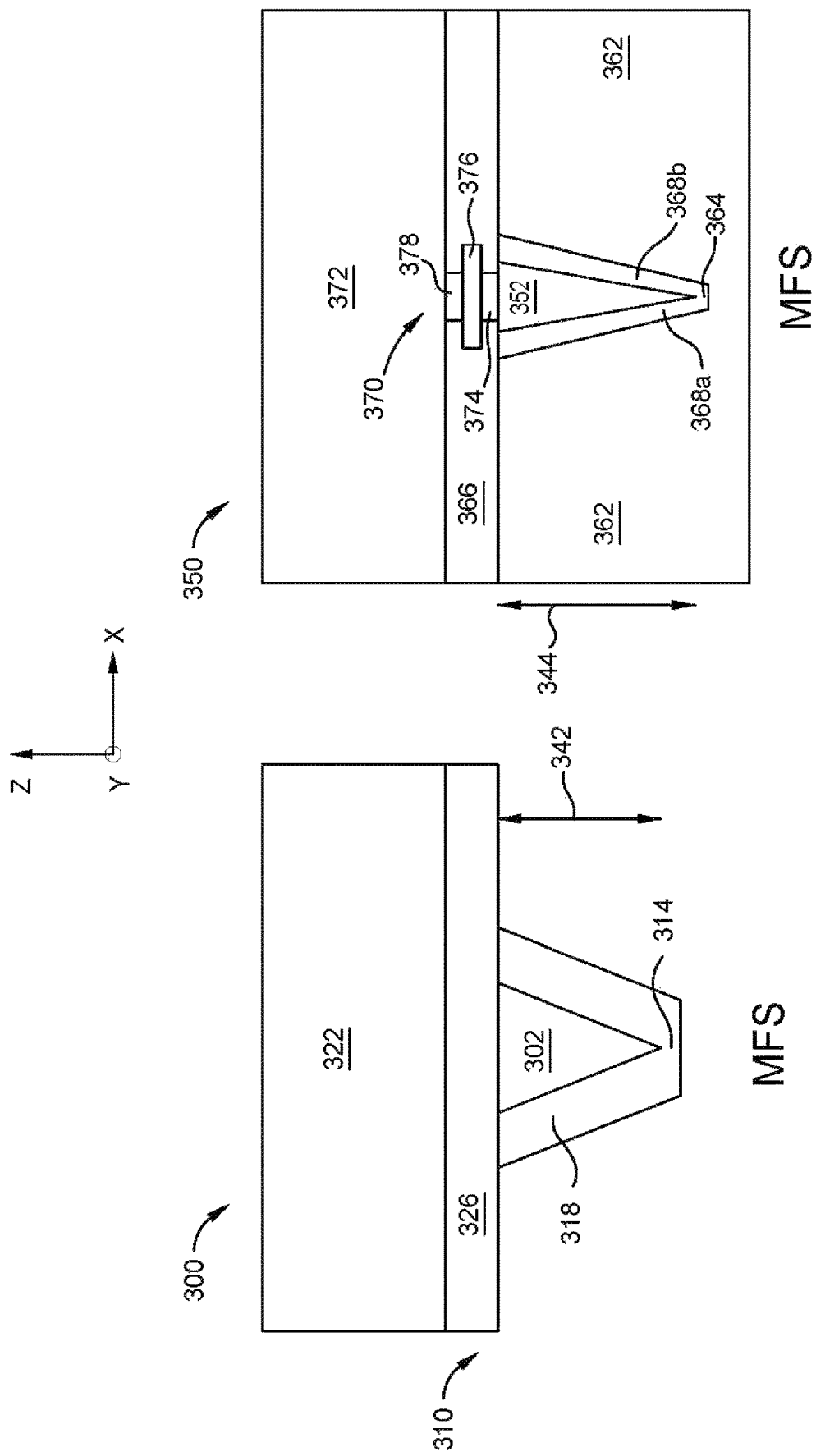
Figure 3E:
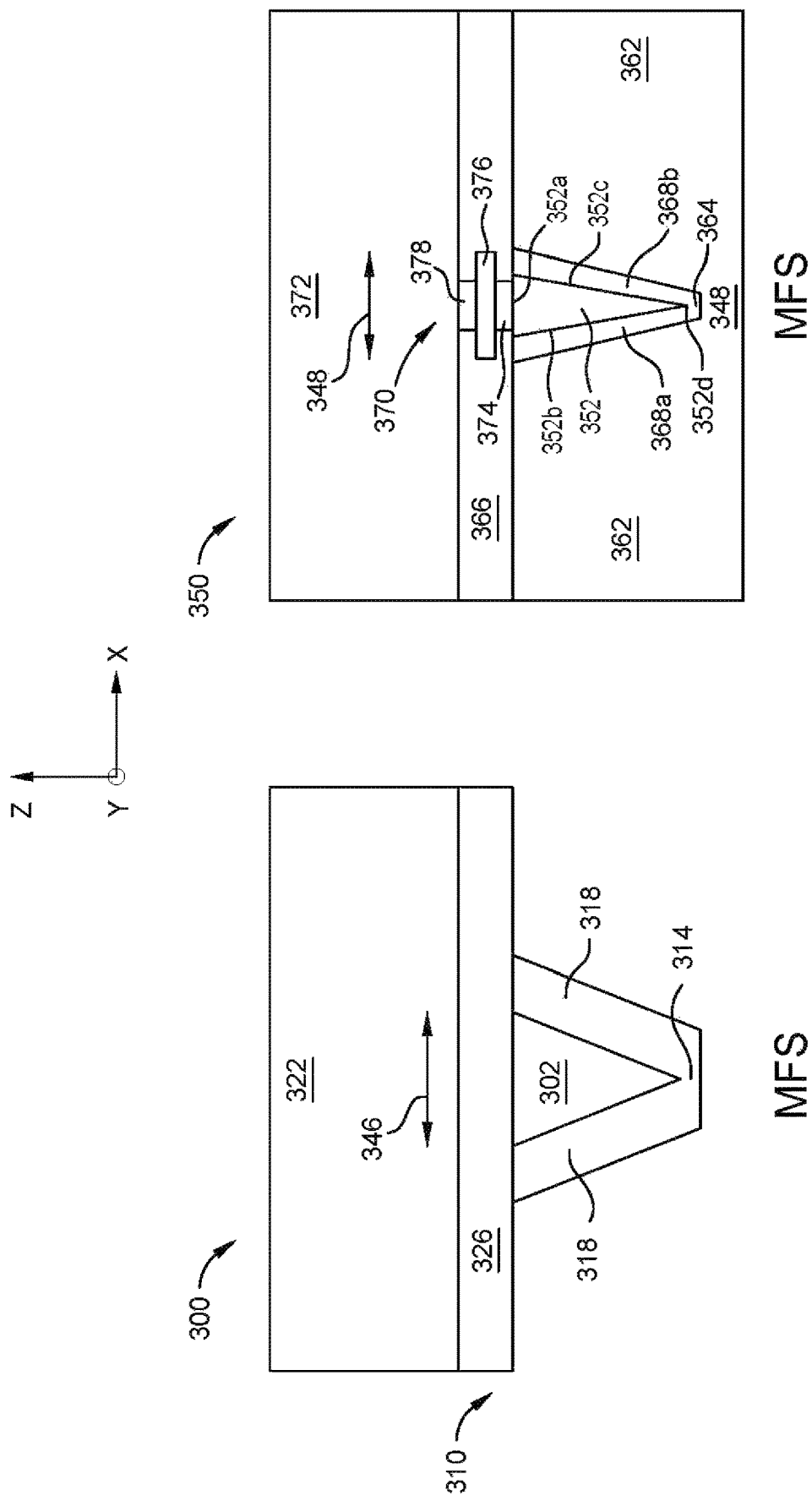

FIGS. 3A-3B illustrate perspective views of a magnetic recording head 300 comprising a first write head 310 and a second write head 350, according to various embodiments. FIG. 3C illustrates a top view of the magnetic recording head 300, according to one embodiment. FIGS. 3D-3E illustrate MFS views of the magnetic recording head 300, according to various embodiments. The magnetic recording head 300 of FIGS. 3A-3E may be used in the disk drive 100 of FIG. 1 and/or the read/write heads 200, 290 of FIGS. 2A-2B. Similarly, the first write head 310 may be the first write head 210 of FIGS. 2A-2B and the second write head 350 may be the second write head 250 of FIGS. 2A-2B.

The first write head 310 comprises a first main pole 302 coupled to a first yoke 304 and the second write head 350 comprises a second main pole 352 coupled to a second yoke 354. A first EAMR stack or EAMR structure 370, such as a spin-orbit torque (SOT) structure or a spin transfer torque (STT) structure, is disposed on the second main pole 352. An STT structure is described below in FIGS. 3F-3G, and an SOT structure is described below in FIGS. 3H-3I. A second EAMR structure 320 may optionally be disposed on the first main pole 302, as shown in FIG. 3A.

When an STT structure is utilized as the EAMR structure 370, electrical current flows from the second main pole 352 to the second trailing shield 372 through a field generation layer (FGL) during operation. Transmitted polarized electrons from a spin polarization layer (SPL) and/or from reflected electrons are injected into the FGL causing switching or precession of the magnetization of the FGL by spin transfer torque from the injected electrons. Switching or precession of the magnetization of the FGL generates an assisting field to the write field. When an SOT structure is utilized as the EAMR structure 370, charge current through a spin Hall layer (e.g., a heavy metal or topological insulator) generates a spin current in the spin Hall layer during operations. The spin orbital coupling of the spin Hall layer and a spin torque layer (STL) causes switching or precession of magnetization of the STL by the spin orbital coupling of the spin current from the spin Hall layer. The spin currents from the spin Hall layer exert a spin orbital torque that causes the magnetization of the STL to switch or precession. Switching or precession of the magnetization of the STL generates an assisting field to the write field.

The first write head 310 may include a heat assisted magnetic recording (HAMR) element (not shown), such as a light source or laser (e.g., in the form of an NFT), or the first write head 310 may be a conventional write head. Moreover, the second write head 350 comprises a side shield 362, whereas the first write head 310 does not, as shown in FIGS. 3D-3E. In one embodiment, the first write head 310 is a wide-writing write head optimized to increase the BPI capability, and the second write head 350 is a narrow-writing write head optimized to increase the TPI capability.

The first yoke 304 may have a first length 306 (i.e., in the y-direction) that is equal to or greater than a second length 356 of the second yoke 354, as shown in FIG. 3A. A first coil 308 is wrapped around the first yoke 304 and a second coil 358 is wrapped around the second yoke 354, as shown in FIG. 3B. The first coil 308 may have a length that is equal to or greater than a length of the second coil 358. Thus, the first coil 308 may wrap around the first yoke 304 more times than the second coil 358 wraps around the second yoke 354. For example, as shown in FIG. 3B, the first coil 308 wraps around the first yoke 304 about four times while the second coil 358 wraps around the second yoke 354 about twice. However, the first and second coils 308, 358 may wrap around the first and second yokes 304, 354, respectively, any number of times, and the number of wraps of the first and second coils 308, 358 are not intended to be limiting.

Moreover, the first coil 308 may wrap around the first yoke 304 in either the same direction or the opposite direction as the second coil 358 wraps around the second yoke 354, as shown in FIGS. 3B-3C. In one embodiment, the first coil 308 wraps around the first yoke 304 in a clockwise direction and the second coil 358 wraps around the second yoke 354 in the clockwise direction as well, like shown in FIG. 3B. In another embodiment, the first coil 308 wraps around the first yoke 304 in a counter-clockwise direction and the second coil 358 wraps around the second yoke 354 in the counter-clockwise direction as well. In yet another embodiment, the first coil 308 wraps around the first yoke 304 in the clockwise direction and the second coil 358 wraps around the second yoke 354 in the counter-clockwise direction. In another embodiment, the first coil 308 wraps around the first yoke 304 in the counter-clockwise direction (shown by arrow 332) and the second coil 358 wraps around the second yoke 354 in the clockwise direction (shown by arrow 334), like shown in FIG. 3C.

The first yoke 304 has a rectangular shape, where a first surface 304a and a second surface 304b (not shown in the perspective view) parallel to the first surface 304a have a greater width in the x-direction than a width in the z-direction of a third surface 304c and a fourth surface 304d (not shown in the perspective view) parallel to the third surface 304c. The first coil 308 may comprise first portions 308a comprised of a first material and second portions 308b comprised of a second material different than the first material. In such an embodiment, the first portions 308a of the first coil 308 are disposed adjacent to the first and second surfaces 304a, 304b of the first yoke 304, and the second portions 308b of the first coil 308 are disposed on the third and fourth surfaces 304c, 304d of the first yoke 304. Thus, each wrap of the first coil 308 may comprise first portions 308a comprised of a first material and second portions 308b comprised of a second material different than the first material.

Additionally, the first portions 308a of the first coil 308 may be spaced from the first and second surfaces 304a, 304b of the first yoke 304 while the second portions 308b of the first coil 308 may be directly coupled to the third and fourth surfaces 304c, 304d of the first yoke 304. Thus, the second portions 308b of the first coil 308 may be considered part of the first yoke 304 (i.e., flares coming off the first yoke 304). In another embodiment, the first coil 308 may be comprised of only one material.

Similarly, the second yoke 354 has a rectangular shape, where a first surface 354a and a second surface 354b (not shown in the perspective view) parallel to the first surface 354a have a greater width in the x-direction than a width in the z-direction of a third surface 354c and a fourth surface 354d (not shown in the perspective view) parallel to the third surface 354c. The second coil 358 may comprise first portions 358a comprised of a first material and second portions 358b comprised of a second material different than the first material. In such an embodiment, the first portions 358a of the second coil 358 are disposed adjacent to the first and second surfaces 354a, 354b of the second yoke 354, and the second portions 358b of the second coil 358 are disposed on the third and fourth surfaces 354c, 354d of the second yoke 354. Thus, each wrap of the second coil 358 may comprise first portions 358a comprised of the first material and second portions 358b comprised of the second material different than the first material.

Additionally, the first portions 358a of the second coil 358 may be spaced from the first and second surfaces 354a, 354b of the second yoke 354 while the second portions 358b of the second coil 358 may be directly coupled to the third and fourth surfaces 354c, 354d of the second yoke 354. Thus, the second portions 358b of the second coil 358 may be considered part of the second yoke 354 (i.e., flares coming off the second yoke 354). In another embodiment, the second coil 358 may be comprised of only one material.

In embodiments where the first and second coils 308, 358 comprise multiple materials, the first material of the first coil 308 is the same as the first material of the second coil 358, and the second material of the first coil 308 is the same as the second material of the second coil 358. The first material is a non-magnetic electrically conductive material, such as copper (Cu), and the second material is a magnetic material, such as nickel-iron or nickel-iron alloy (NiFe). The first and second yokes 304, 354 each comprise the same second material as the second portions 308b, 358b of the first and second coils 308, 358. Thus, the first and second yokes 304, 354 each comprise a magnetic material, such as NiFe.

Because the first yoke 304 has a greater length than the second yoke 354, and because the first coil 308 wraps around the first yoke 304 more times than the second coil 358 wraps around the second yoke 354, the first write head 310 has a greater write field and a slower data rate than the second write head 350. As such, the first write head 310 is optimized to increase a BPI capability of the magnetic recording head 300, more than the extent of the second head 350, for example. Similarly, because the second yoke 354 has a shorter length than the first yoke 304, and because the second coil 358 wraps around the second yoke 354 the same number or a fewer number of times than the first coil 308 wraps around the first yoke 304, the second write head 350 has a higher data rate and a smaller write field than the first write head 310. As such, the second write head 350 is optimized to increase a TPI capability of the magnetic recording head 300, more than the extent of the first head 310, for example.

In one embodiment shown in FIG. 3D, the first write head 310 is adjacent to the second write head 350 in the cross-track direction (i.e., the x-direction) such that the first and second write heads 310, 350 are disposed side-by-side. In another embodiment shown in FIG. 3E, the first write head 310 is vertically aligned with the second write head 350 such that the first write head 310 is stacked on or over the second write head 350 (i.e., aligned in the z-direction). In other words, a center axis of a first main pole 302 of the first write head 310 is linearly aligned with a center axis of a second main pole 352 of the second write head 350. Thus, the first and second write heads 310, 350 may be disposed in a side-by-side formation or in a stacked formation.

As further shown in FIGS. 3D-3E, the first write head 310 comprises a first trailing shield 322 disposed above the first main pole 302 and a first trailing gap 326 disposed between the first main pole 302 and the first trailing shield 322. First side gaps 318 are disposed around two surfaces of the first main pole 302 adjacent to the first trailing gap 326, and a first leading gap 314 is disposed between the first side gaps 318. Similarly, the second write head 350 comprises a second trailing shield 372 disposed above the second main pole 352, and a second trailing gap 366 disposed between the second main pole 352 and the second trailing shield 372. The second main pole 352 is surrounded by the second trailing gap 366, a second leading gap 364, a first side gap 368a, and a second side gap 368b (collectively referred to as side gaps 368). The first side gaps 318 of the first write head 310 may have a greater width than the side gaps 368 of the second write head 350. The first side gaps 318 of the first write head 310 and the side gaps 368 of the second write head 350 may each comprise an insulating material, such as alumina.

The second main pole 352 comprises a first surface 352a, a second surface 352b, a third surface 352c, and a fourth surface 352d. The first and second main poles 302, 352 may each comprise fewer or more surfaces, as the first and second main poles 302, 352 may each have a different shape. The second trailing gap 366 is disposed between and in contact with the first surface 352a of the second main pole 352 and the second trailing shield 372. The second leading gap 364 is disposed below and in contact with the fourth surface 352d of the second main pole 352. The first side gap 368a of the second write head 350 is disposed adjacent to and in contact with the second surface 352b of the second main pole 352, and the second side gap 368b of the second write head 350 is disposed adjacent to and in contact with the third surface 352c of the second main pole 352.

The second write head 350 further comprises a side shield 362 disposed around two or more of the first, second, third, and fourth surfaces 352a-352d of the second main pole 352. The side shield 362 may be a virtual side shield, as discussed below in FIGS. 4-8. A portion of the side shield 362 may be disposed adjacent to the second leading gap 364 below the fourth surface 352d of the second main pole 352 may be considered a leading shield, or a separate leading shield may be disposed below the second leading gap 364, like shown in FIG. 7. The magnetic recording head 300 may further comprise one or more read heads and a thermal fly height control (TFC) element. In such an embodiment, at least one read head and the TFC element are aligned with a center axis of the second main pole 352.

At least the second write head 350 comprises an EAMR structure 370 disposed in the second trailing gap 366 between the second main pole 352 and the second trailing shield 372. The first write head 310 may optionally include an EAMR structure (like shown in FIG. 3A) or may include a HAMR element (not shown). Various types of EAMR structures may be used, as will be shown here in FIGS. 3D-3E and in FIGS. 3F-3J below. Here in FIGS. 3D-3E, the EAMR structure 370 may comprise a first STL 374, a heavy metal or topological insulator layer 376, and a second STL 378. Both the first and second STLs 374, 378 may have a thickness of about 4 nm. The heavy metal layer or topological insulator layer 376 may comprise beta phase tungsten ($\beta$-W), platinum (Pt), beta phase tantalum ($\beta$-Ta), or a topological insulator, such as BiSb, TeBiSb, TeBi, or TeSb. Other heavy metal materials that can be used include Hf, WHf, WIr, Bi doped with Cu, FeMn, PfMn, IrMn, and other suitable materials. The first and second STLs 374, 378 may comprise a magnetic material, such as CoFe, Coir, NiFe, or a CoFeX alloy, where X=B, Ta, Re, or Ir.

When current (I) is applied to the second write head 350, the current flows through the heavy metal or topological insulator layer 376 in the +x-direction. Due to the Spin Hall effect in the heavy metal or topological insulator layer 376, the spins accumulated on the surface of the heavy metal or topological insulator layer 376 can switch the first and second STLs 374, 378 of the EAMR stack 370. The EAMR stack 370 may be controlled by the current magnitude flowing in the heavy metal or topological insulator layer 376.

Additionally, the first main pole 302 has a first width 346 that is greater than a second width 348 of the second main pole 352, as shown in FIG. 3E. In other words, the first main pole 302 has a greater width than the second main pole 352 in the cross-the-track direction (i.e., the x-direction). The first main pole 302 has a first length or height 342 that is less than a second length or height 344 of the second main pole 352, as shown in FIG. 3D. In other words, the first main pole 302 has a shorter length or height than the second main pole 352 in the along-the-track direction (i.e., the z-direction). The first write head 310 having a wide first main pole 302 and no side shields allows the first write head 310 to maximize the write field from the first main pole 302, and further enables the write field to be tilted. The second write head 350 having a narrow second main pole 352 enables the second write head 350 to perform very fine, focused writes to a media.

The magnetic recording head 300 may execute random writes to a media. When writing to a media, the first write head 310 widely writes every other track (e.g., the even tracks). Following the write of the even tracks by the first write head 310, the second write head 350 narrowly writes the remaining unwritten tracks (e.g., the odd tracks). The second write of the second write head 350 trims the adjacent edges of the even tracks written by the first write head 310, and thus, the writing of the media does not experience reading track edge curvature, which increases the ADC of the magnetic recording head 300.

Figure 3F:
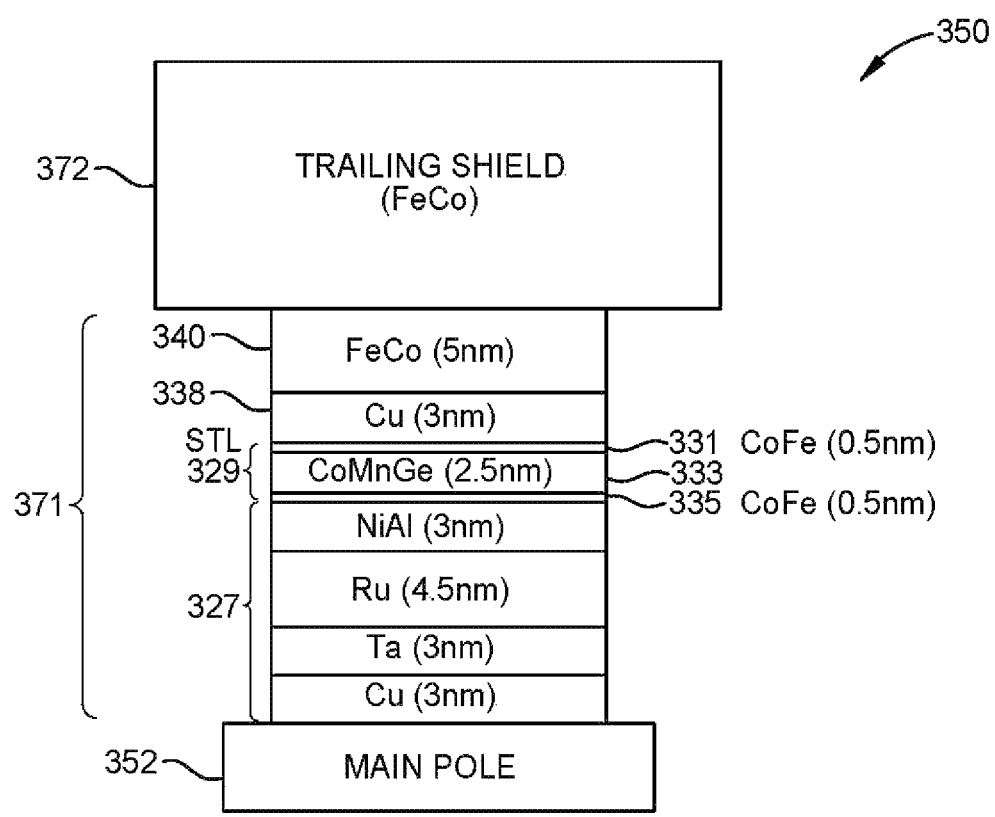
FIGS. 3F-3G illustrate MFS views of write heads comprising a spin transfer torque stack or structure, according to various embodiments.

FIG. 3F illustrates an MFS view of the second write head 350 comprising an STT stack 371, according to one embodiment. The STT stack 371 may be the EAMR stack 370 of FIGS. 3A-3C, as an alternative to the EAMR stack 370 shown in FIGS. 3D-3E. While not shown in FIG. 3F, the first write head 310 is disposed adjacent to the second write head 350 as shown in FIGS. 3A-3E, and the first write head 310 may be a HAMR write head or a conventional write head. FIG. 3F illustrates the STT stack 371 disposed between the second main pole 352 and the second trailing shield 372 of the second write head 350. The STT stack 371 comprises a non-magnetic layer 327, an STL layer 329, a spacer 338, and an optional magnetic notch 340. The STL layer 329 may be a DC-field-generation layer. Moreover, while not shown in FIG. 3F, a non-magnetic conductive layer may be disposed between the side shields 362 and the second main pole 352, like shown in FIG. 3J. The second write head 350 may be any of the writers comprising a DC-field-generation layer, for example, as described in U.S. Pat. No. 10,366,714 entitled "Magnetic Write Head for Providing Spin-Torque-Assisted Write Field Enhancement," filed on Jul. 26, 2017, which is hereby incorporated by reference in its entirety.

The non-magnetic layer 327 is disposed between and adjacent to the second main pole 352 and the STL layer 329. In the embodiment illustrated in FIG. 3F, the non-magnetic layer 327 includes four sublayers: (1) a copper sublayer that is approximately 3 nm thick, (2) a tantalum sublayer that is approximately 3 nm thick, (3) a ruthenium sublayer that is approximately 4.5 nm thick, and (4) a NiAl sublayer that is approximately 3 nm thick. The STL layer 329, which is disposed between and adjacent to the non-magnetic layer 327 and the spacer 338, comprises a first layer 331 comprising CoFe, a second layer 333 comprising CoMnGe, and a third layer 335 comprising CoFe. In the embodiment shown in FIG. 3F, the first layer 331, which abuts the spacer 338, is about 0.5 nm thick, the second layer 333 is about 2.5 nm thick, and the third layer 335, which abuts the non-magnetic layer 327, is about 0.5 nm thick. The spacer 338, which is disposed between and adjacent to the magnetic notch 340 and the STL layer 329, comprises copper and is approximately 3 nm thick. The optional magnetic notch 340, which is disposed between and adjacent to the second trailing shield 372 and the spacer 338, comprises FeCo and is approximately 5 nm thick.

Figure 3G:
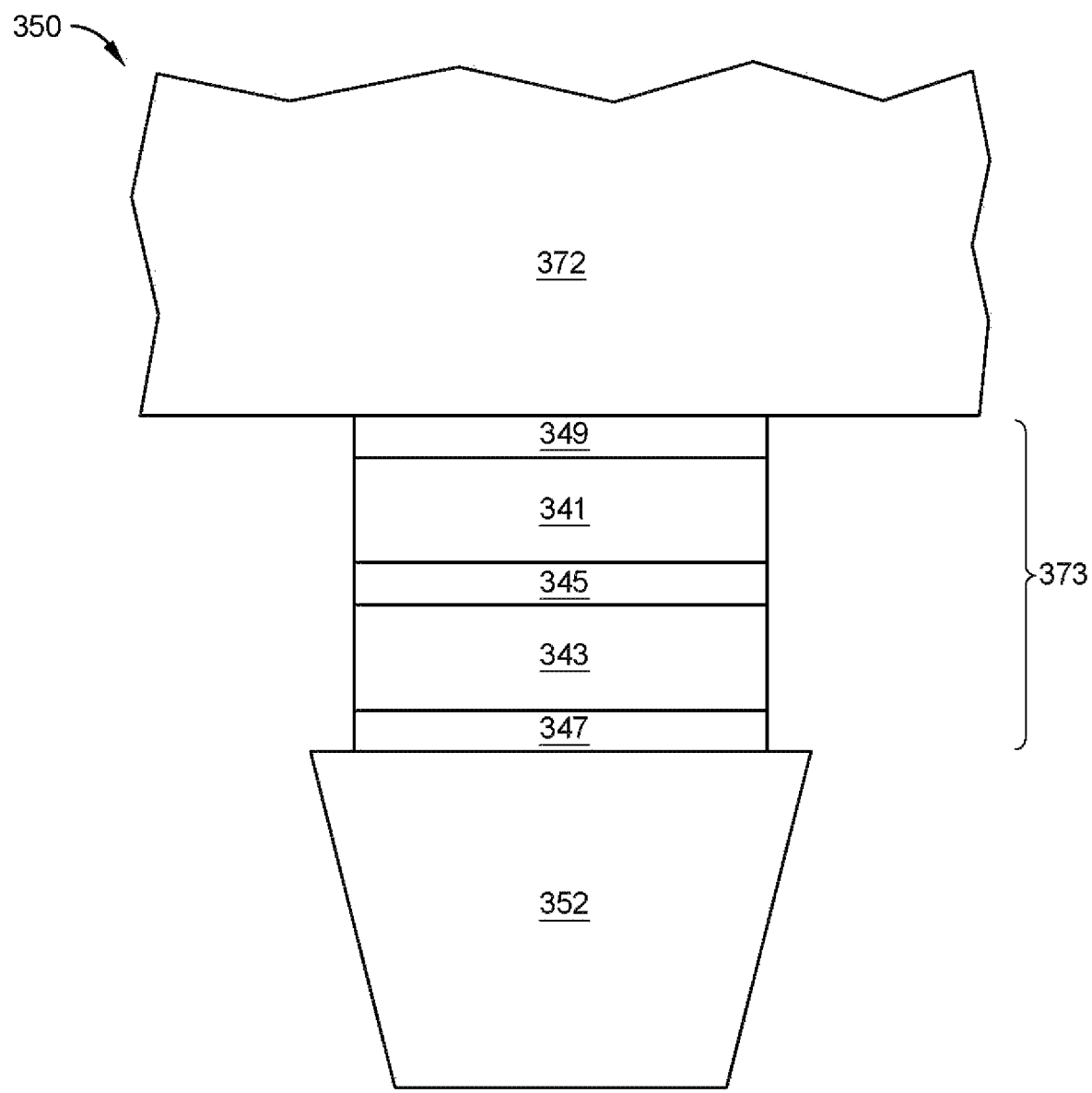

FIG. 3G illustrates an MFS view of the second write head 350 comprising an STT stack 373, according to another embodiment. The STT stack 373 may be the EAMR stack 370 of FIGS. 3A-3C, as an alternative to the EAMR stack 370 shown in FIGS. 3D-3E. While not shown in FIG. 3G, the first write head 310 is disposed adjacent to the second write head 350 as shown in FIGS. 3A-3E, and the first write head 310 may be a HAMR write head or a conventional write head. Moreover, while not shown in FIG. 3G, a non-magnetic conductive layer may be disposed between the side shields 362 and the second main pole 352, like shown in FIG. 3J. The second write head 350 may be any of the magnetic write heads comprising an STO, for example, as described in U.S. Pat. No. 8,970,966 entitled "Spin-Torque Oscillator for Microwave Assisted Magnetic Recording," filed on Sep. 27, 2012, which is hereby incorporated by reference in its entirety. Additionally, the second write head 350 may be any of the write heads comprising an STO, for example, as described in U.S. Pat. No. 7,982,996 entitled "Perpendicular Magnetic Recording Write Head and System with Improved Spin Torque Oscillator for Magnetic-Assisted Magnetic Recording," filed on Dec. 7, 2009, which is hereby incorporated by reference in its entirety.

FIG. 3G illustrates the STT stack 373 disposed between the second main pole 352 and the second trailing shield 372 of the second write head 350. The STT stack 373 comprises includes a spin injection layer 343 and a magnetic FGL 341. In one embodiment, the spin injection layer 343 can be constructed of an alloy such as CoPt, CoCrPt, CoPd, FePt, CoFePd, TbFeCo, or a multilayer film structure such as Co/Pt, Co/Pd, Co/Ni could be used. The magnetic FGL 341 may comprise a magnetic material having a high saturation magnetic moment, such as a Co—Fe alloy. The magnetic FGL 341 is located in a trailing direction closer to the second trailing shield 372 between the second trailing shield 372 and the first interlayer 345. The spin injection layer 343 is located in a leading direction closer to the second main pole 352, between the second main pole 352 and the first interlayer 345.

In the embodiment shown, the second interlayer 349 contacts the top or trailing surface of the magnetic FGL 341 and is located between the magnetic FGL 341 and the second trailing shield 372. A third interlayer 347 can be located between the spin injection layer 343 and the second main pole 352. The spin injection layer 343 has a magnetization that is pinned in a desired direction, whereas the magnetization of the magnetic FGL 341 is free to move so as to generate a magnetic oscillation.

Figure 3H:
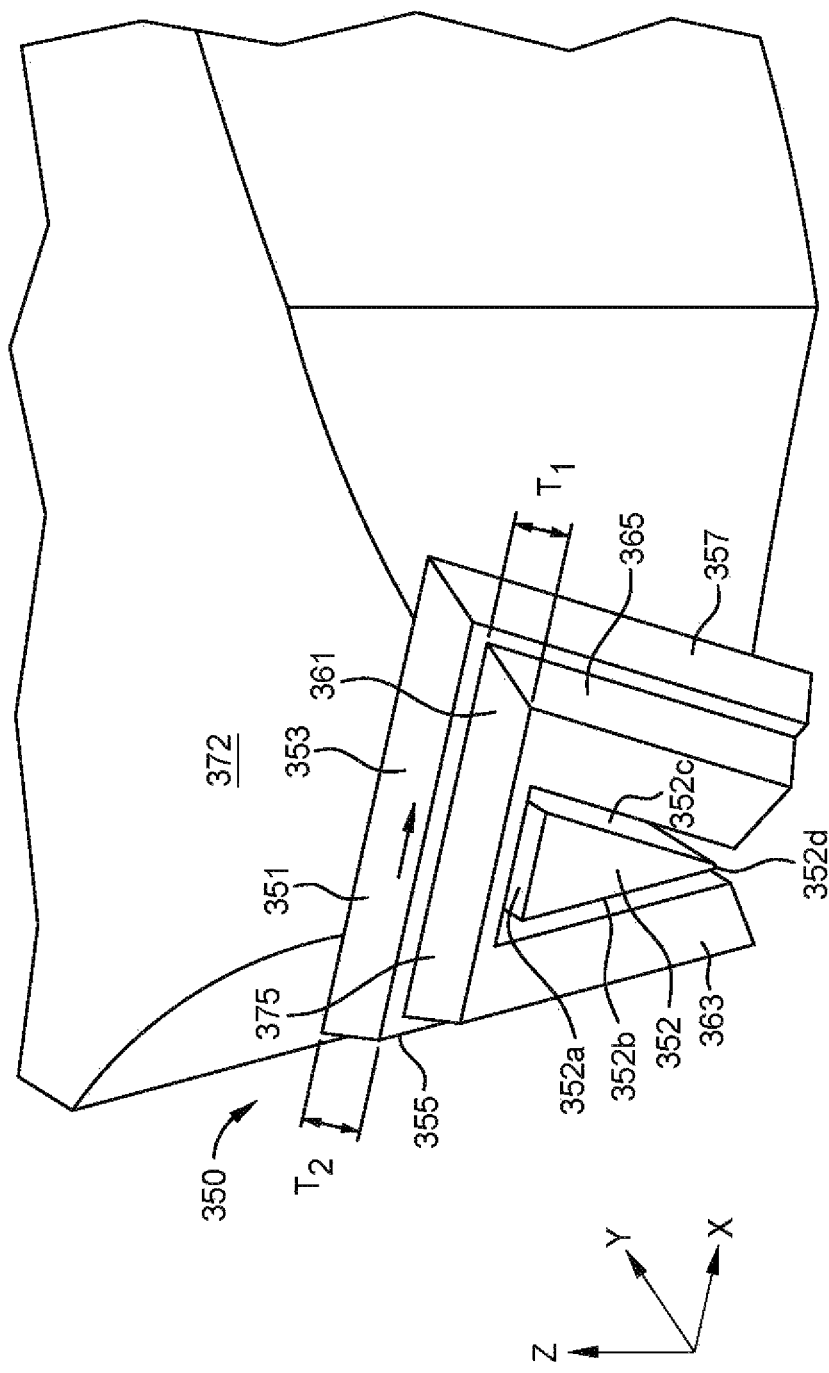
FIGS. 3H-3I illustrate MFS views of write heads comprising a spin orbital torque stack or structure, according to various embodiments.

FIG. 3H illustrates an MFS view of the second write head 350 comprising an SOT stack or SOT structure 375, according to one embodiment. While not shown in FIG. 3H, the first write head 310 is disposed adjacent to the second write head 350 as shown in FIGS. 3A-3E, and the first write head 310 may be a HAMR write head or a conventional write head. The SOT stack 375 may be the EAMR stack 370 of FIGS. 3A-3C, as an alternative to the EAMR stack 370 shown in FIGS. 3D-3E. Moreover, while not shown in FIG. 3H, a non-magnetic conductive layer may be disposed between the side shields 362 and the second main pole 352, like shown in FIG. 3J. The second write head 350 may be any of the magnetic write heads comprising a spin torque structure, for example, as described in U.S. Pat. No. 10,181, 334 entitled "Spin-Orbit Based Magnetic Recording," filed on Jun. 23, 2017, which is hereby incorporated by reference in its entirety.

At least a portion of the second main pole 352 at the MFS is surrounded by the SOT structure 375. The SOT structure 375 is disposed at the MFS. The SOT structure 375 surrounds the first, second, and third surfaces 352a-352c of the second main pole 352. The SOT structure 375 is coupled to the spin Hall structure 351 disposed at a location that is recessed from the MFS. The spin Hall structure 351 surrounds at least a portion of the second main pole 352 at locations recessed from the MFS. The spin Hall structure 351 surrounds the first, second, and third surfaces 352a-352c of the second main pole 352. The SOT structure 375 has a thickness T1 along the Y-axis. In one embodiment, the thickness T1 ranges from about 1.5 nm to about 15 nm. The spin Hall structure 351 also has a thickness T2 along the Y-axis. In one embodiment, the thickness T2 ranges from about 2.5 nm to about 100 nm. The spin Hall structure 351 is recessed from the MFS by a distance that equals the thickness T1 of the SOT structure 375. During operation, AC electrical current (I) flows from the preamp (not shown) to the spin Hall structure 351, and the electrical current (I) may flow through the spin Hall structure 351, as shown in FIG. 3H. The spin Hall structure 351 generates SOT, which induces magnetization switching (or precession) of the SOT structure 375.

The SOT structure 375 includes a first portion 361, a second portion 363 connected to the first portion 361, and a third portion 365 opposite the second portion 363. The first portion 361 faces the trailing shield hot seed layer (not shown). The first portion 361 is substantially parallel to the first surface 352a of the second main pole 352. The second portion 363 is substantially parallel to the second surface 352b of the second main pole 352. The third portion 365 is substantially parallel to the third surface 352c of the second main pole 352. In some embodiments, the SOT structure 375 surrounds the first surface 352a, the second surface 352b, and the third surface 352c, while the fourth surface 352d of the second main pole 352 may not face a portion of the SOT structure 375, as shown in FIG. 3H. A dielectric material (not shown) is disposed between each portion 361, 363, 365 of the SOT structure 375 and a corresponding surface of the surfaces 352a, 352b, 352c of the second main pole 352.

A spin Hall structure 351 includes a first portion 353, a second portion 355 connected to the first portion 353, and a third portion 357 opposite the second portion 355. The first portion 353 of the spin Hall structure 351 is coupled to the first portion 361 of the SOT structure 375, the second portion 355 of the spin Hall structure 351 is coupled to the second portion 363 of the SOT structure 375, and the third portion 357 of the spin Hall structure 351 is coupled to the third portion 365 of the SOT structure 375. The first portion 353 of the spin Hall structure 351 may be substantially parallel to the first portion 361 of the SOT structure 375, the second portion 355 of the spin Hall structure 351 may be substantially parallel to the second portion 363 of the SOT structure 375, and the third portion 357 of the spin Hall structure 351 may be substantially parallel to the third portion 365 of the SOT structure 375. In some embodiments, the spin Hall structure 351 surrounds the first surface 352a, the second surface 352b, and the third surface 352c, while the fourth surface 352d of the second main pole 352 may not face a portion of the spin Hall structure 351, as shown in FIG. 3H. A dielectric material (not shown) is disposed between each portion 353, 355, 357 of the spin Hall structure 351 and a corresponding surface of the surfaces 352a-352c of the second main pole 352.

Figure 3I:
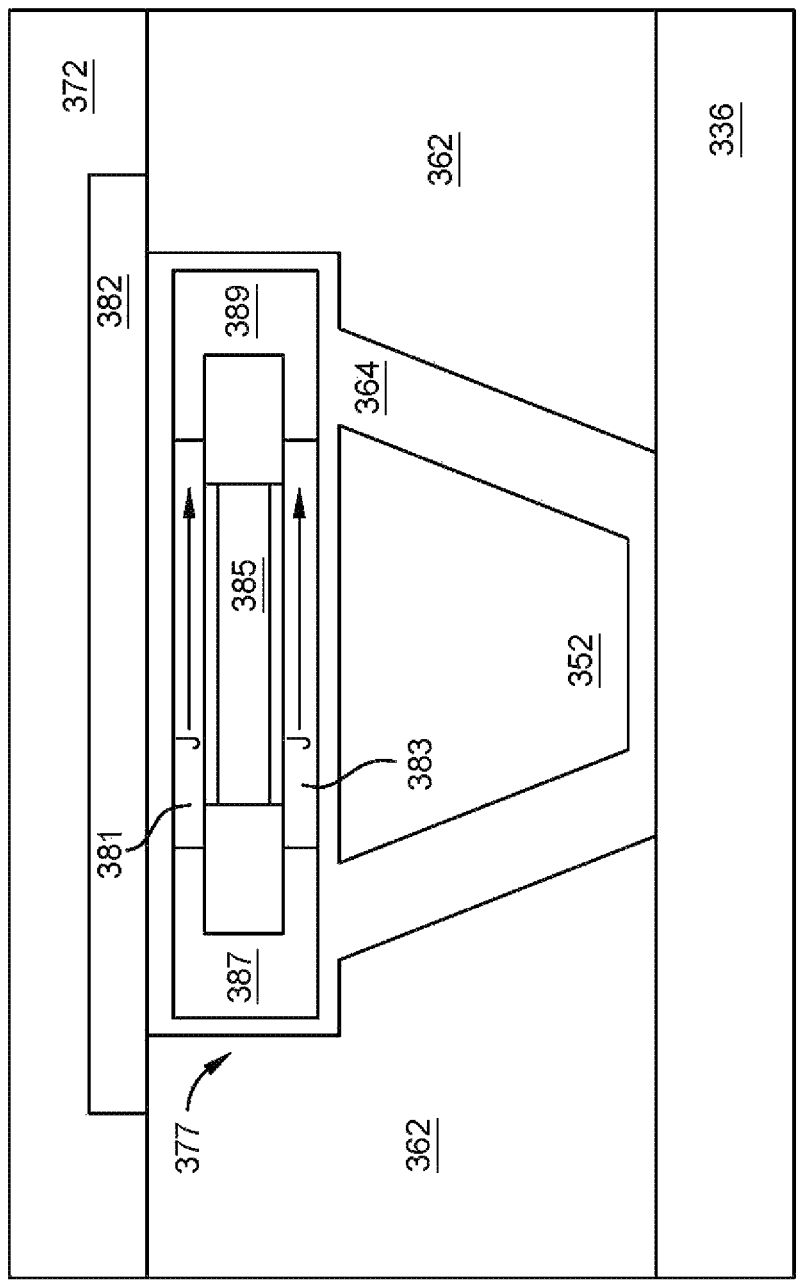

FIG. 3I illustrates an MFS view of the second write head 350 comprising an SOT stack or SOT structure 377, according to one embodiment. The SOT stack 377 may be the EAMR stack 370 of FIGS. 3A-3C, as an alternative to the EAMR stack 370 shown in FIGS. 3D-3E. While not shown in FIG. 3I, the first write head 310 is disposed adjacent to the second write head 350 as shown in FIGS. 3A-3E, and the first write head 310 may be a HAMR write head or a conventional write head. Moreover, while not shown in FIG. 3I, a non-magnetic conductive layer may be disposed between the side shields 362 and the second main pole 352, like shown in FIG. 3J. The second write head 350 may be any of the magnetic write heads comprising an SOT structure, for example, as described in U.S. Pat. No. 10,014,012 entitled "Spin-Orbit Torque Based Magnetic Recording," filed on Jun. 23, 2017, which is hereby incorporated by reference in its entirety. Additionally, the second write head 350 may be any of the write heads comprising an SOT structure, for example, as described in U.S. patent application Ser. No. 16/453,991 entitled "Spin Orbital Torque Based Microwave Assisted Magnetic Recording with Dual Spin Hall Layers or Wrap Around Spin Hall Layer," filed on Jun. 26, 2019, which is hereby incorporated by reference in its entirety.

FIG. 3I illustrates the SOT stack 377 disposed between the second main pole 352 and the second trailing shield 372 of the second write head 350. The second trailing shield 372 comprises a hot seed layer 382 disposed adjacent to the SOT stack 377, and a leading shield 336 is disposed below the second main pole 352 opposite the second trailing shield 372. The SOT structure 377 comprises a first spin Hall layer 381, a second spin Hall layer 383, and a STL 385 between the first spin Hall layer 381 and the second spin Hall layer 383. The first spin Hall layer 381 comprises a heavy metal having a first spin Hall angle, and the second spin Hall layer 383 comprises a heavy metal having a second spin Hall angle, in which the first spin Hall angle and the second spin Hall angle have opposite signs (as in plus versus minus).

For example, in one embodiment, the first spin Hall layer 381 comprises a heavy metal material having a positive spin Hall angle, such as platinum, while the second spin Hall layer 383 comprises a heavy metal material having a negative spin Hall angle, such as beta phase tungsten (β-W) or beta phase tantalum (β-Ta). In another embodiment, the first spin Hall layer 381 comprises a heavy metal material having a negative spin Hall angle, such as beta phase tungsten (β-W) or beta phase tantalum (β-Ta) while the second spin Hall layer 383 comprises a heavy metal material having a positive spin Hall angle, such as platinum. Other heavy metal or topological insulator materials that can be used include Hf, WHf, WIr, TeBiSb, TeBi, TeSb, Bi doped with Cu, FeMn, PfMn, IrMn, and other suitable materials. The STL 385 comprises a ferromagnetic material such as one or more layers of CoFe, CoIr, NiFe, or CoFeX alloy wherein X=B, Ta, Re, or Ir.

A first electrical lead 387 is connected to one end of the first spin Hall layer 381 and of the second spin Hall layer 383, and a second electrical lead 389 is connected to the other end of the first spin Hall layer 381 and of the second spin Hall layer 383. During operation, a charge current flows through the first spin Hall layer 381 and the second spin Hall layer 383 in a cross-track direction. As shown in FIG. 3I, the charge current flows from left to right. In other embodiments, the charge current can flow from right to left.

Figure 3J:
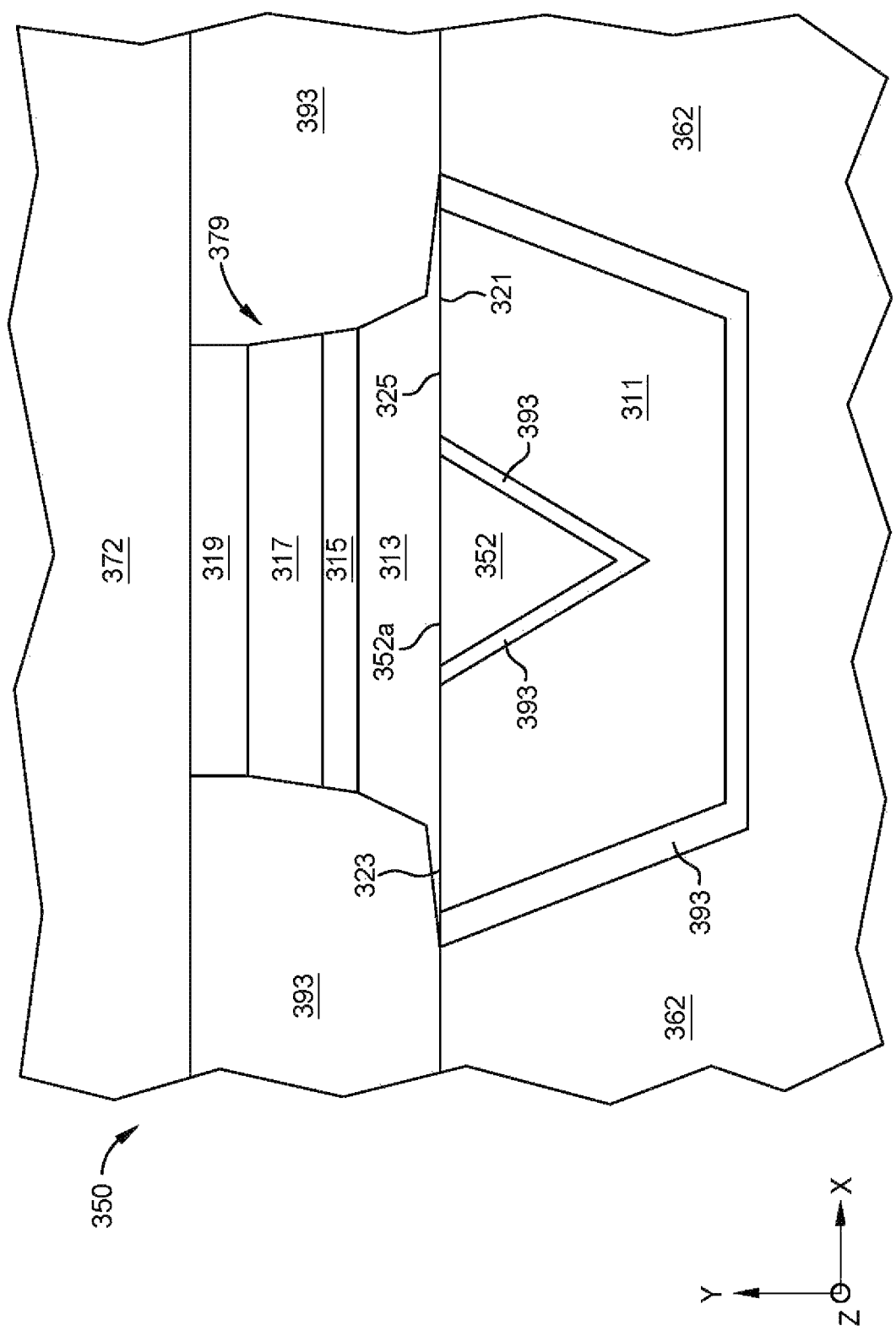
FIG. 3J illustrates an MFS view of a write head comprising an EAMR stack and a non-magnetic conductive structure to enable maximum current efficiency and uniformity, according to one embodiment.

FIG. 3J is a MFS view of a portion of the second write head 350 of FIGS. 3A-3I, according to one embodiment. The second write head 350 of FIGS. 3A-3I may include the non-magnetic conductive structure 311 shown and described in FIG. 3J. The second write head 350 may be any of the write heads comprising an STO, for example, as described in U.S. patent application Ser. No. 16/015,163 entitled "Magnetic Recording Head with Non-Magnetic Conductive Structure," filed on Jun. 21, 2018, which is hereby incorporated by reference in its entirety.

As shown in FIG. 3J, the second write head 350 includes the second trailing shield 372, the second main pole 352, the EAMR stack 390 disposed between the second trailing shield 372 and the second main pole 352, a non-magnetic conductive structure 311 surrounding a portion of the second main pole 352, and side shields 362 surrounding the non-magnetic conductive structure 311. A dielectric material 393 is disposed between the non-magnetic conductive structure 311 and the second main pole 352. The dielectric material 393 is also disposed between the side shields 362 and the non-magnetic conductive structure 311.

In one embodiment, the EAMR stack 379 may be the EAMR stack 370 of FIGS. 3D-3E, the STT stack 371 of FIG. 3F, the STT stack 373 of FIG. 3G, the SOT stack 375 of FIG. 3H, or the SOT stack 377 of FIG. 3I. In another embodiment, the EAMR stack 379 may be an alternative to the EAMR stack 370 shown in FIGS. 3D-3E, the STT stacks shown in FIGS. 3F-3G, and the SOT stacks shown in FIGS. 3H-3I. For example, the EAMR stack 379 may include different layers or different configuration of layers than the stacks described above in FIGS. 3D-3I. As shown, the EAMR stack 379 includes a first magnetic layer 313, a second magnetic layer 317, an interlayer 315 disposed between the first magnetic layer 313 and the second magnetic layer 317, and a cap layer 319. In one embodiment, the first magnetic layer 313 is the SPL and the second magnetic layer 317 is the FGL. The SPL is located proximate to the second main pole 352, and the FGL is located proximate to the second trailing shield 372. In another embodiment, the first magnetic layer 313 is the FGL and the second magnetic layer 317 is the SPL. The SPL is located proximate to the second trailing shield 372, and the FGL is located proximate to the second main pole 352. The SPL may be a CoNi layer having perpendicular magnetic anisotropy. Other materials may be used as the SPL, such as CoPt, CoCrPt, CoPd, FePt, CoFePd, TbFeCo, CoMnGe, or combinations thereof. The FGL may be a CoFe layer or Co and Fe laminations. The interlayer 315 may be a metal layer having long spin diffusion length such as Au, Ag, Cu, or alloys such as AgSn, when the EAMR stack 379 employs current perpendicular to plane (CPP) giant magnetoresistance (GMR). The cap layer 319 is an electrical conductive layer, such as a Ru/Ta/Ru multilayer stack.

In the embodiment of FIG. 3J, the first surface 352a of the second main pole 352 is in contact with a surface 321 of the EAMR stack 379. The surface 321 is part of the first magnetic layer 313. The non-magnetic conductive structure 311 is fabricated from a non-magnetic electrically conductive metal, such as NiTa, Cr, Cu, Ag, Au, or Rh. In some embodiments, the non-magnetic conductive structure 311 is fabricated from a multilayer stack, such as NiTa/Ru, Cr/Cu, or Cr/Rh. The surface 321 of the EAMR stack 379 contacts the non-magnetic conductive structure 311 at a first surface 323 and a second surface 325. In one embodiment, the non-magnetic conductive structure 311 is separated from the second main pole 352 by the dielectric material 393. In one embodiment, the dielectric material 393 between the non-magnetic conductive structure 311 and the second main pole 352 is replaced with a non-magnetic electrically resistive material. In another embodiment, the non-magnetic conductive structure 311 may be in contact with the second main pole 352. The non-magnetic conductive structure 311 is separated from the side shields 362 by the dielectric material 393.

One or multiple current sources may be used to provide a current flowing to the EAMR stack 379 from the second main pole 352 and a current flowing to the EAMR stack 379 from the non-magnetic conductive structure 311. When multiple current sources are used, the current uniformity can be further controlled by controlling the multiple current sources. The non-magnetic conductive structure 311 provides additional paths for electrical currents to flow to the EAMR stack 379. The non-magnetic conductive structure 311 enables higher current density to the EAMR stack 379 without creating hot spots at the MFS. Maximum current efficiency and uniformity can be achieved with the non-magnetic conductive structure 311. In one embodiment, two current sources are utilized. The first current source is connected to the second main pole 352, and the second current source is connected to the non-magnetic conductive structure 311 to provide independent flow control to the second main pole 352 and the non-magnetic conductive structure 311. In one embodiment, one current source is connected to the second main pole 352 and the non-magnetic conductive structure 311, and the non-magnetic electrically resistive material is disposed between the second main pole 352 and the non-magnetic conductive structure 311 instead of the dielectric material 393. With the non-magnetic electrically resistive material separating the second main pole 352 and the non-magnetic conductive structure 311, a differential current can flow through each of the second main pole 352 and the non-magnetic conductive structure 311 with one current source to achieve maximum current uniformity and efficiency.

Figure 4:
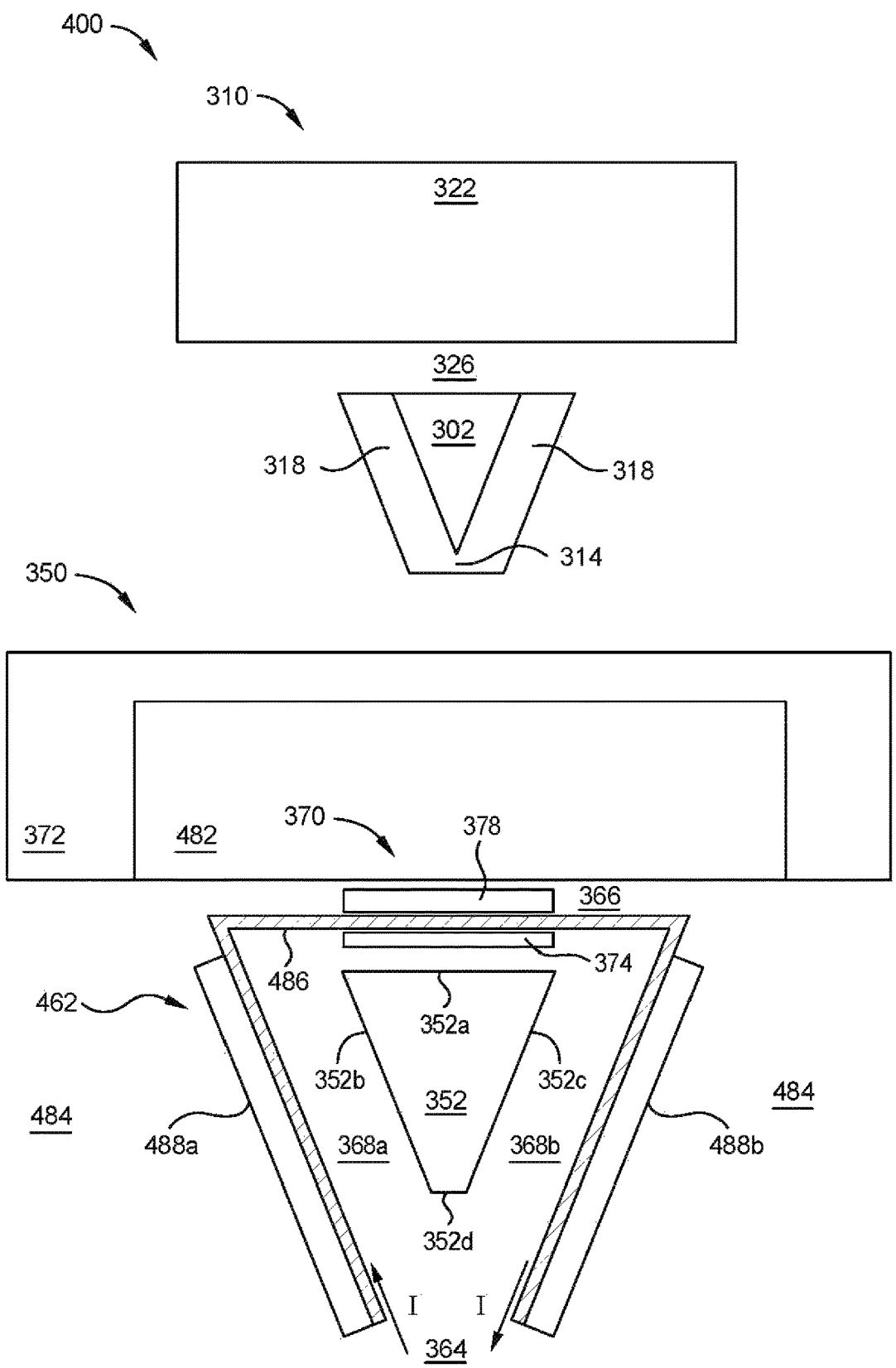
FIG. 4 illustrates an MFS view of a magnetic recording head comprising a first write head and a second write head having a virtual side shield, according to one embodiment.

FIG. 4 illustrates an MFS view of a magnetic recording head 400 comprising a first write head 310 and a second write head 350 having a virtual side shield 462, according to one embodiment. The magnetic recording head 400 may correspond to the magnetic head assembly 121 described in FIG. 1, the read/write heads 200 and 290 described in FIGS. 2A-2B, and/or the magnetic recording head 300 described in FIGS. 3A-3J. The magnetic recording head 400 comprises a first write head 310 and a second write head 350. The first and second write heads 310, 350 of the magnetic recording head 400 may be the first and second write heads 310, 350, respectively, of FIGS. 3A-3E. While the first and second write heads 310, 350 are shown in a side-by-side formation, the first and second write heads 310, 350 may be disposed in a stacked formation, like shown in FIG. 3E. The first write head 310 may be a HAMR write head comprising a HAMR element or a conventional write head. For consistency, the first write head 310 and elements of the second write head 350 are labeled with the same numerals as FIGS. 3A-3E.

The second write head 350 comprises the second main pole 352, the second trailing shield 372 disposed above the second main pole 352, and the EAMR stack 370 disposed between the second main pole 352 and the second trailing shield 372 in the second trailing gap 366. The EAMR stack 370 may be a SOT structure or a STT structure, such as any of the structures shown and described in FIGS. 3D-3J. The second trailing shield 372 comprises a hot seed layer 482. The second trailing shield 372 may comprise NiFe and the hot seed layer 482 may comprise a high moment material, such as CoFeN or FeXN, where X includes at least one of Rh, Al, Ta, Zr, and Ti. While not shown, the first trailing shield 322 of the first write head 310 may also comprise a hot seed layer.

The second write head 350 comprises a virtual side shield (SS) 462 while the first write head 310 does not comprise a side shield. The SS 462 surrounds the first surface 352a, the second surface 352b, and the third surface 352c of the second main pole 352. The SS 462 comprises a first layer 486 and a second layer 488. The first layer 486 of the SS 462 surrounds the first surface 352a, the second surface 352b, and the third surface 352c of the second main pole 352. The first layer 486 is disposed in the second trailing gap 366 between the second trailing shield 372 and the second main pole 352, and adjacent to the first side gap 368a and the second side gap 368b. A portion of the first layer 486 may form or function as a layer of the EAMR stack 370, and may be the heavy metal layer or topological insulator layer 376 of FIGS. 3D-3E or the first spin Hall layer 381 of FIG. 3I. The EAMR stack 370 comprises the first STL 374 and the second STL 378 discussed in FIGS. 3D-3E. As noted above, various other types of EAMR stack 370 (e.g., shown in FIGS. 3F-3J) may be used in place of the one shown in FIG. 4.

The second layer 488 of the SS 462 comprises a first portion 488a and a second portion 488b. The first portion 488a of the second layer 488 is disposed adjacent to the first side gap 368a or the second surface 352b of the second main pole 352, and the second portion 488b of the second layer 488 is disposed adjacent to the second side gap 368b or the third surface 352c of the second main pole 352. The second layer 488 is in contact with the first layer 486, and the first layer 486 is disposed between the second layer 488 and the second main pole 352. The second layer 488 may function as an STL or comprise the same material as the first and second STLs 374, 378. In the magnetic recording head 400, the SS 462 does not surround the second main pole 352 in the second leading gap 364. An insulating material 484 may be disposed adjacent to the second layer 488 of the SS 462, such as alumina.

The first layer 486 comprises a heavy metal material, such as beta phase tungsten (β-W), platinum (Pt), beta phase tantalum (β-Ta), or a topological material, such as BiSb, TeBiSb, TeBi, TeSb. Other heavy metal materials that can be used include Hf, WHf, WIr, Bi doped with Cu, FeMn, PfMn, IrMn, and other suitable materials. The first layer 486 may have a thickness between about 2 nm to about 20 nm, such as about 6 nm. The second layer 488 comprises a magnetic material, such as CoFe, CoIr, NiFe, or a CoFeX alloy, where X=B, Ta, Re, or Ir. The second layer 488 may have a thickness between about 2 nm to about 10 nm, such as about 6 nm. The first layer 486 and the second layer 488 of the virtual SS 462 may together have a total thickness between about 4 nm to about 30 nm.

In one embodiment, the EAMR stack 370 may contact the first surface 352a of the second main pole 352 (i.e., the trailing side), or a nickel oxide layer may be disposed between the first surface 352a of the second main pole 352 and the EAMR stack 370. In another embodiment, a dusting layer, such as yttrium iron garnet (YIG), MgO, or NiO, may be disposed between the second main pole 352 and the EAMR stack 370. When current (I) is applied to the second write head 350 of the magnetic recording head 400, the current flows through the first layer 486 comprising a heavy metal or topological insulator material. Due to the spin Hall effect in the first layer 486, the spins accumulated on the surface of the first layer 486 can switch the second layer 488 and the EAMR stack 370. The switching of the virtual SS 462 and the EAMR stack 370 may be controlled by the current magnitude flowing in the first layer 486.

Figure 5:
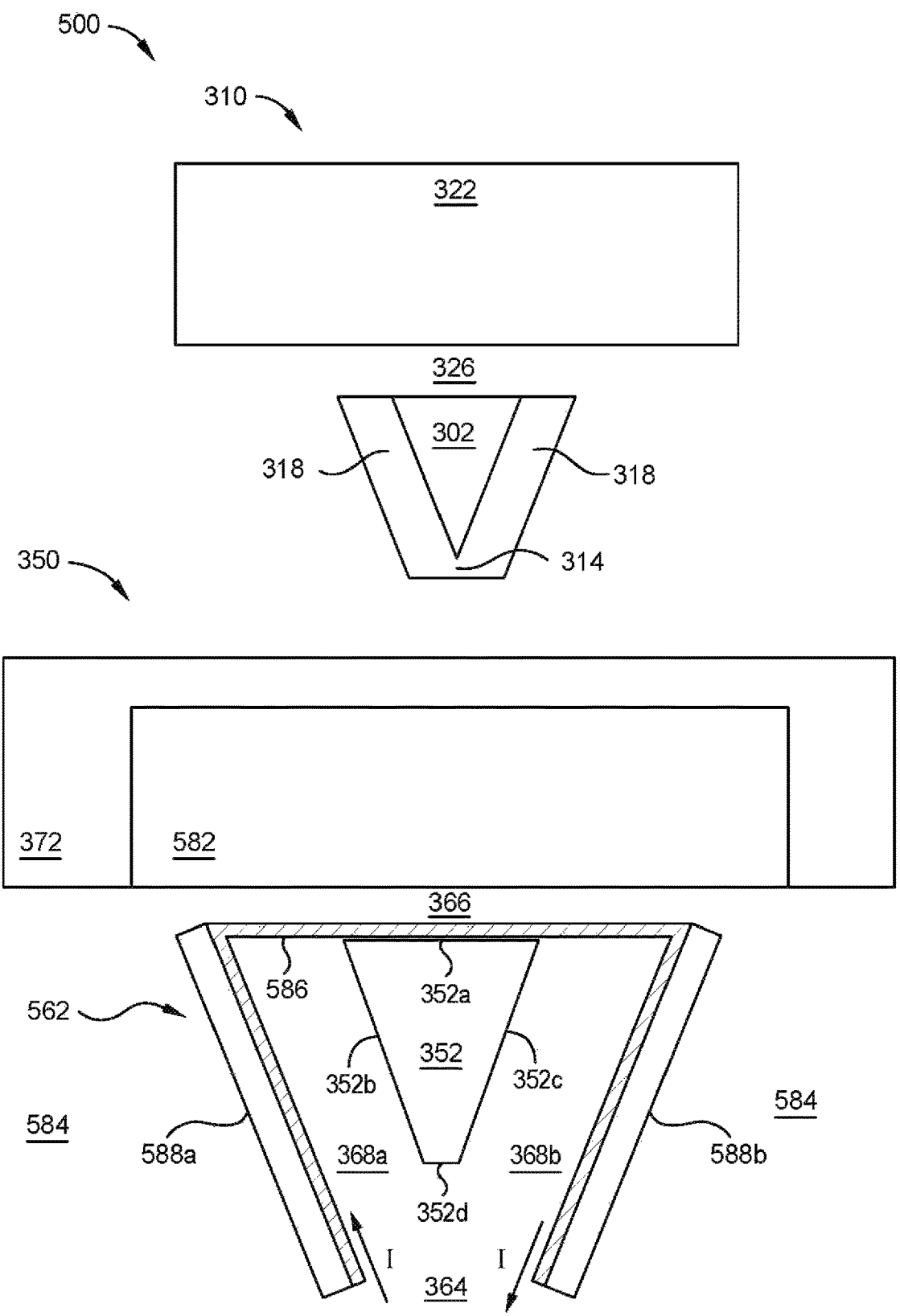
FIG. 5 illustrates an MFS view of a magnetic recording head comprising a first write head and a second write head having a virtual side shield, according to another embodiment.

FIG. 5 illustrates an MFS view of a magnetic recording head 500 comprising a first write head 310 and a second write head 350 having a virtual side shield 562, according to one embodiment. The magnetic recording head 500 may correspond to the magnetic head assembly 121 described in FIG. 1, the read/write heads 200 and 290 described in FIGS. 2A-2B, and/or the magnetic recording head 300 described in FIGS. 3A-3J. The magnetic recording head 500 comprises a first write head 310 and a second write head 350. The first and second write heads 310, 350 of the magnetic recording head 500 may be the first and second write heads 310, 350, respectively, of FIGS. 3A-3J. While the first and second write heads 310, 350 are shown in a side-by-side formation, the first and second write heads 310, 350 may be disposed in a stacked formation, like shown in FIG. 3E. The first write head 310 may be a HAMR write head comprising a HAMR element or a conventional write head. For consistency, the first write head 310 and elements of the second write head 350 are labeled with the same numerals as FIGS. 3A-3E.

The magnetic recording head 500 of FIG. 5 is similar to the magnetic recording head 400 of FIG. 4; however, the second write head 350 of the magnetic recording head 500 may optionally comprise an EAMR stack disposed in the second trailing gap 366. The second write head 350 of the magnetic recording head 500 may comprise an EAMR stack (not shown), an SOT structure, or an STT structure disposed at another location, such as any of the structures shown and described in FIGS. 3D-3J. The second trailing shield 372 comprises a hot seed layer 582, such as the hot seed layer 482 of FIG. 4. While not shown, the first trailing shield 322 of the first write head 310 may also comprise a hot seed layer.

The second write head 350 comprises a virtual SS 562 while the first write head 310 does not comprise a side shield. The virtual SS 562 surrounds the first surface 352a, the second surface 352b, and the third surface 352c of the second main pole 352. The SS 562 comprises a first layer 586 and a second layer 588. The first layer 586 of the SS 562 surrounds the first surface 352a, the second surface 352b, and the third surface 352c of the second main pole 352. The first layer 586 is disposed in the second trailing gap 366 between the second trailing shield 372 and the second main pole 352, and adjacent to the first side gap 368a and the second side gap 368b of the second write head 350.

The second layer 588 of the SS 562 comprises a first portion 588a and a second portion 588b. The first portion 588a of the second layer 588 is disposed adjacent to the first side gap 368a or the second surface 352b of the second main pole 352, and the second portion 588b of the second layer 588 is disposed adjacent to the second side gap 368b or the third surface 352c of the second main pole 352. The second layer 588 is in contact with the first layer 586, and the first layer 586 is disposed between the second layer 588 and the second main pole 352. In one embodiment, the second layer 588 is in contact with the first layer 586, and the second layer 588 is disposed between the first layer 586 and the second main pole 352. The second layer 588 may function as an STL, and may comprise the same material as the first and second STLs 374, 378 of FIGS. 3D-3E. In the magnetic recording head 500, the SS 562 does not surround the second main pole 352 in the second leading gap 364. An insulating material 584 may be disposed adjacent to the second layer 588 of the SS 562, such as alumina.

The first layer 586 comprises a heavy metal material, such as beta phase tungsten (β-W), Pt, beta phase tantalum (β-Ta), or a topological insulator material, such as BiSb, TeBiSb, TeBi, TeSb. Other heavy metal materials that can be used include Hf, WHf, WIr, Bi doped with Cu, FeMn, PfMn, IrMn, and other suitable materials. The first layer 586 may have a thickness between about 2 nm to about 20 nm, such as about 4 nm. The second layer 588 comprises a magnetic material, such as CoFe, CoIr, NiFe, or a CoFeX alloy, where X=B, Ta, Re, or Ir. The second layer 588 may have a thickness between about 2 nm to about 10 nm, such as about 6 nm. The first layer 586 and the second layer 588 of the virtual SS 562 may together have a total thickness between about 4 nm to about 30 nm. The portion of the first layer 586 disposed in the second trailing gap 366 may function as an EAMR structure.

In one embodiment, the first layer 586 may contact the first surface 352a of the second main pole 352 (i.e., the trailing side), or a nickel oxide layer or a YIG layer may be disposed between the first surface 352a of the second main pole 352 and the first layer 586. When current (I) is applied to the second write head 350 of the magnetic recording head 500, the current flows through the first layer 586 comprising a heavy metal or topological insulator material. Due to the spin Hall effect in the first layer 586, the spins accumulated on the surfaces of the first layer 586 can switch the second layer 588. Additionally, due to the spin Hall effect in the first layer 586, the spins accumulated on the surfaces of the first layer 586 can tilt the magnetization direction of the first surface 352a surface the second main pole 352 to be pointing less towards the second trailing shield 372, which can reduce magnetic flux from the second main pole 352 to the second trailing shield 372 or increase magnetic flux from the second main pole 352 to a media (i.e., increasing the write field). The tilt of magnetization may be controlled by the current magnitude flowing in the first layer 586.

Figure 6A:
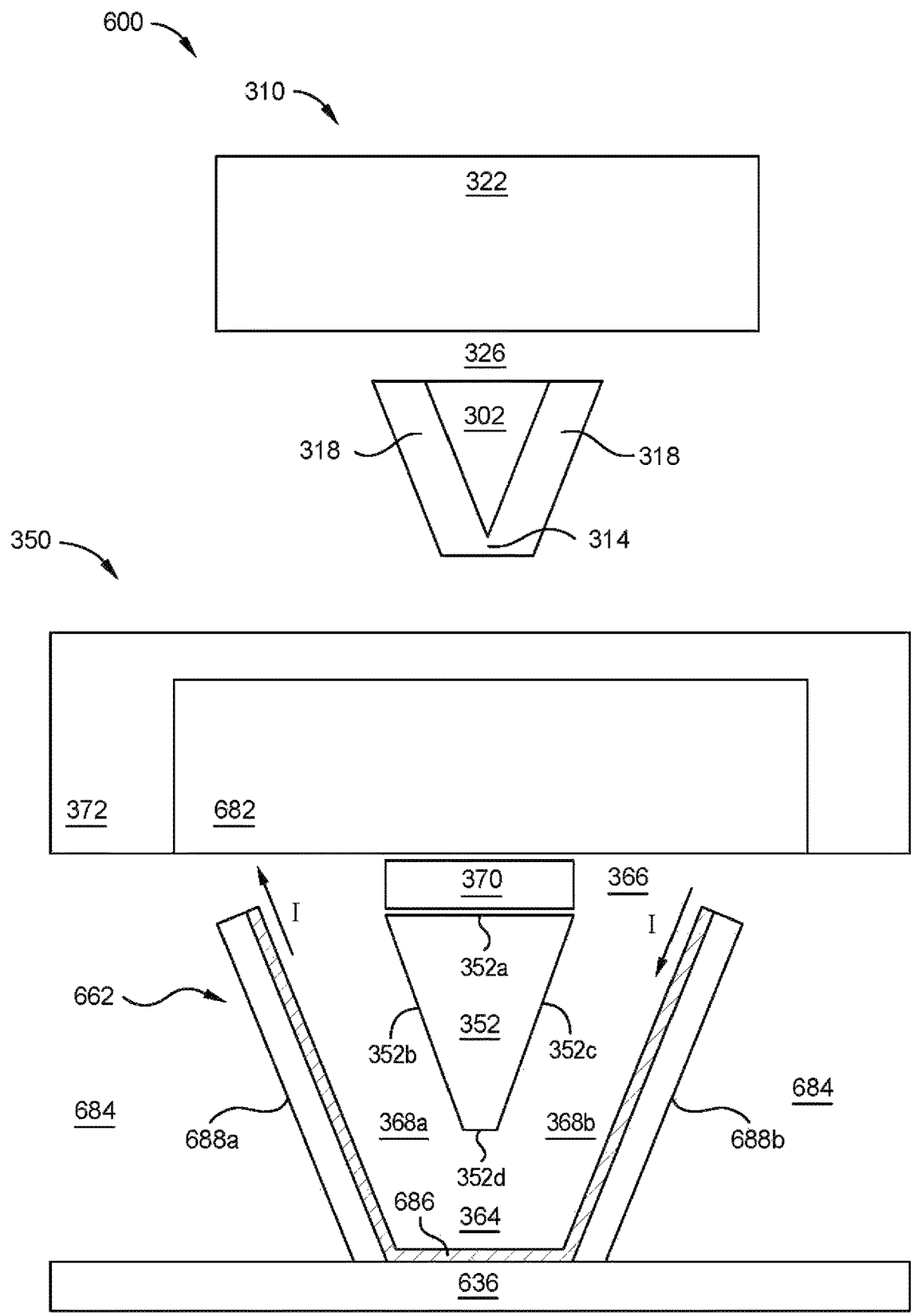
FIGS. 6A-6C illustrate MFS views of magnetic recording heads each comprising a first write head and a second write head having a virtual side shield, according to various embodiments.
Figure 6B:
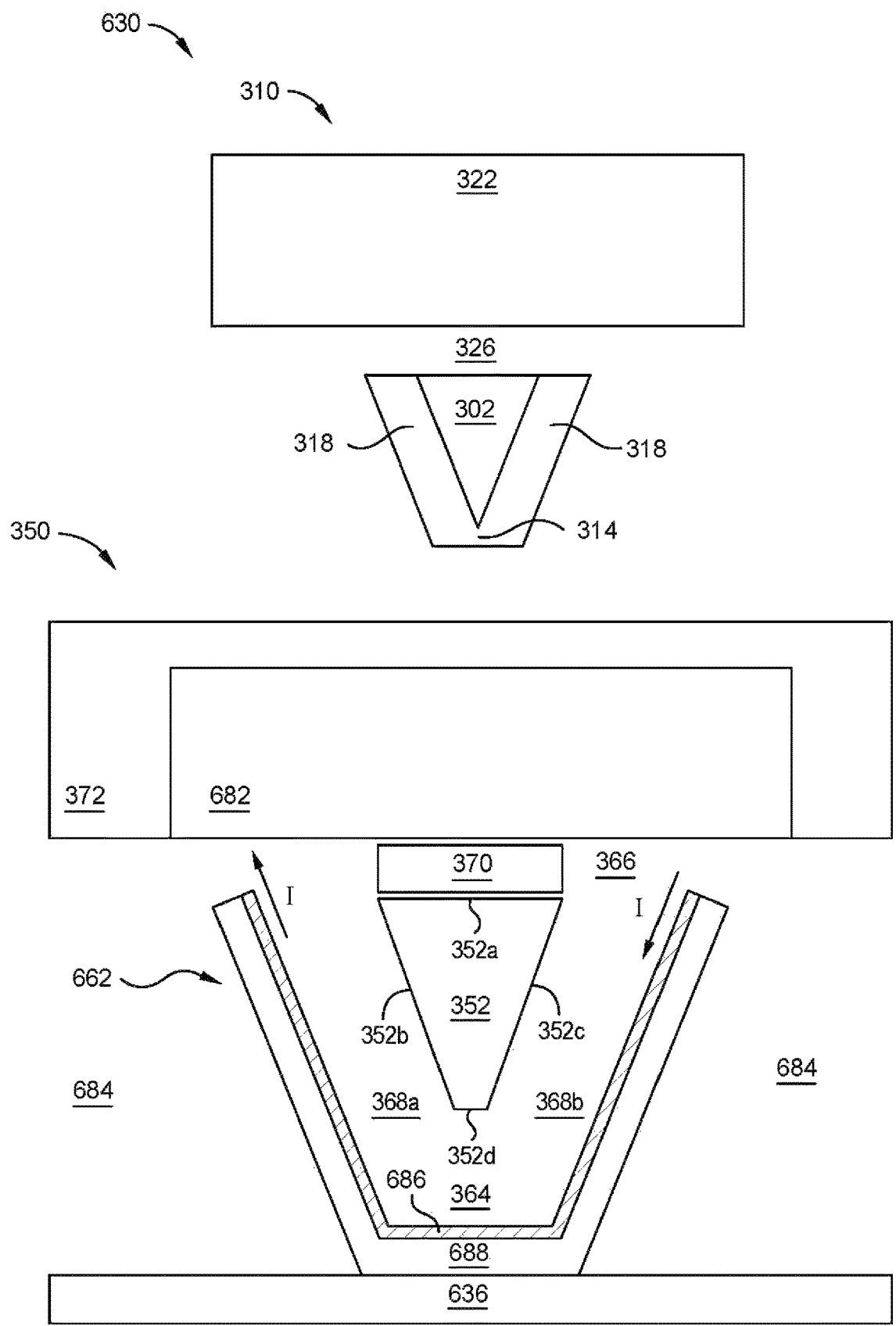
Figure 6C:
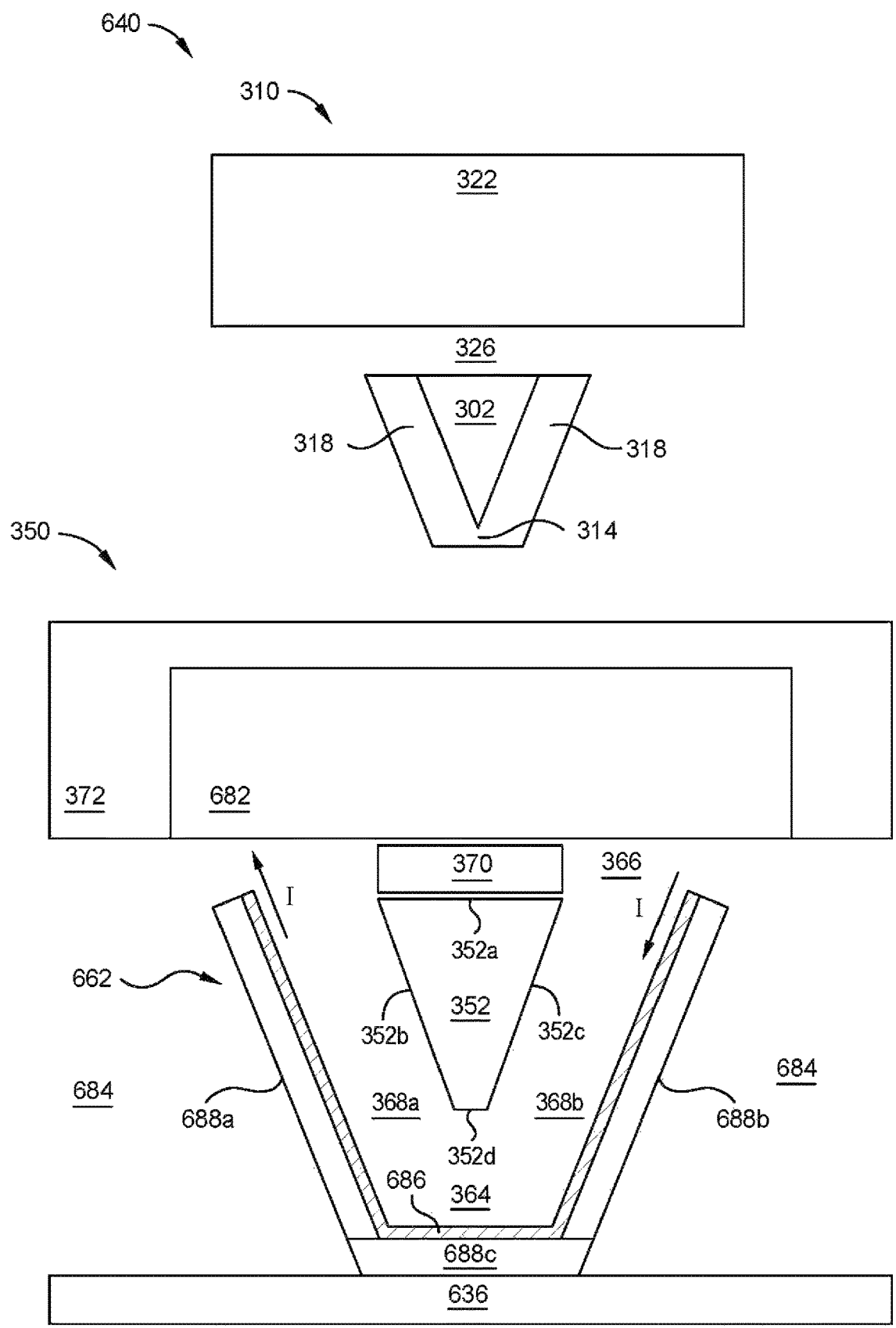

FIGS. 6A-6C illustrate MFS views of magnetic recording heads 600, 630, 640, respectively, each comprising a first write head 310 and a second write head 350 having a virtual side shield 662, according to various embodiments. Each of the magnetic recording heads 600, 630, 640 may individually correspond to the magnetic head assembly 121 described in FIG. 1, the read/write heads 200 and 290 described in FIGS. 2A-2B, and/or the magnetic recording head 300 described in FIGS. 3A-3J. Each magnetic recording heads 600, 630, 640 comprises a first write head 310 and a second write head 350. The first and second write heads 310, 350 of the magnetic recording heads 600, 630, 640 may be the first and second write heads 310, 350, respectively, of FIGS. 3A-3E. While the first and second write heads 310, 350 are shown in a side-by-side formation, the first and second write heads 310, 350 may be disposed in a stacked formation, like shown in FIG. 3E. The first write head 310 may be a HAMR write head comprising a HAMR element or a conventional write head. For consistency, the first write head 310 and elements of the second write head 350 are labeled with the same numerals as FIGS. 3A-3E.

The second write head 350 comprises a leading shield 636 disposed below the second leading gap 364. The second trailing shield 372 may comprise NiFe and the hot seed layer 682 may comprise a high moment material, such as such as CoFeN or FeXN, where X includes at least one of Rh, Al, Ta, Zr, and Ti. While not shown, the first trailing shield 322 of the first write head 310 may also comprise a hot seed layer, and the first write head 310 may comprise a leading shield disposed below the first leading gap 314.

The second write head 350 of each of the magnetic recording heads 600, 630, 640 further comprises a virtual SS 662 surrounding the second surface 352b, the third surface 352c, and the fourth surface 352d of the second main pole 352. The SS 662 comprises a first layer 686 and a second layer 688 in contact with one or more surfaces of the first layer 686. The first layer 686 is disposed between the second layer 688 and the second main pole 352. The second layer 688 may function as an STL, and may comprise the same material as the first and second STLs 374, 378 of FIGS. 3D-3E. The first write head 310 of each of the magnetic recording heads 600, 630, 640 does not comprise a side shield.

In each magnetic recording head 600, 630, 640, the first layer 686 of the SS 662 surrounds the second surface 352b, the third surface 352c, and the fourth surface 352d of the second main pole 352. The first layer 686 is disposed in the second leading gap 364 and adjacent to the first side gap 368a and the second side gap 368b. The SS 662 does not surround the second main pole 352 in the second trailing gap 366. An EAMR structure 370 may optionally be disposed in the second trailing gap 366 between the second main pole 352 and the hot seed layer 682. In one embodiment, the EAMR structure 370 may comprise a seed layer, a spin polarization layer, a copper (Cu) layer, and a notch layer. In another embodiment, the EAMR structure 370 may comprise a seed layer, a spin injection layer, a Cu layer, a FGL, and a notch layer. In yet another embodiment, the EAMR structure 370 may comprise a metal layer. The EAMR structure 370 may be any of the structures shown and described in FIGS. 3D-3J.

In each magnetic recording head 600, 630, 640, the first layer 686 comprises a heavy metal material, such as beta phase tungsten (β-W), Pt, beta phase tantalum (β-Ta), or a topological insulator material, such as BiSb, TeBiSb, TeBi, TeSb. Other heavy metal materials that can be used include Hf, WHf, WIr, Bi doped with Cu, FeMn, PfMn, IrMn, and other suitable materials. The first layer 686 may have a thickness between about 2 nm to about 9 nm, such as about 4 nm to about 6 nm. The first layer 686 and the second layer 688 of the virtual SS 662 may together have a total thickness between about 4 nm to about 30 nm. An insulating material 684 may be disposed adjacent to the second layer 688 of the SS 662, such as alumina.

When current (I) is applied to the second write head 350 of each of the magnetic recording heads 600, 630, 640, the current flows through the first layer 686 comprising a heavy metal material. Due to the spin Hall effect in the first layer 686, the spins accumulated on the surfaces of the first layer 686 can switch the second layer 688. The switching of the virtual SS 662 may be controlled by the current magnitude flowing in the first layer 686.

In the second write head 350 of the magnetic recording head 600 of FIG. 6A, the second layer 688 of the SS 662 comprises a first portion 688a and a second portion 688b. The first portion 688a of the second layer 688 is adjacent to the first side gap 368a and the second surface 352b of the second main pole 352, and the second portion 688b of the second layer 688 is adjacent to the second side gap 368b and the third surface 352c of the second main pole 352. In the second write head 350 of the magnetic recording head 600, the second layer 688 is not disposed in the second leading gap 364 adjacent to the fourth surface 352d of the second main pole 352 or in the second trailing gap 366 adjacent to the first surface 352a of the second main pole 352. A portion of the first layer 686 disposed below the second leading gap 364 is disposed on and in contact with the leading shield 636, and a portion of the second layer 688 disposed adjacent to the second leading gap 364 is disposed on and in contact with the leading shield 636. Thus, in the second write head 350 of the magnetic recording head 600, only the first layer 686 is disposed in the second leading gap 364.

In the second write head 350 of the magnetic recording head 600 of FIG. 6A, the first portion 688a and the second portion 688b of the second layer 688 may comprise the same material or a different material, and may have the same thickness or a different thickness. The first portion 688a and the second portion 688b of the second layer 688 may each comprise a magnetic material, such as CoFe, CoIr, NiFe, or a CoFeX alloy, where X=B, Ta, Re, or Ir. The first portion 688a and the second portion 688b of the second layer 688 may each have a thickness between about 2 nm to about 10 nm, such as about 6 nm.

In the second write head 350 of the magnetic recording head 630 of FIG. 6B, the second layer 688 of the SS 662 surrounds the second surface 352b, the third surface 352c, and the fourth surface 352d of the second main pole 352. The second layer 688 is disposed in the second leading gap 364 and adjacent to the first side gap 368a and the second side gap 368b. A portion of the second layer 688 disposed below the second leading gap 364 is disposed on and in contact with the leading shield 636. In the second write head 350 of the magnetic recording head 630 of FIG. 6B, the second layer 688 is one continuous layer (i.e., not comprised of portions, or comprised of three portions seamlessly coupled together to form one layer). Thus, in the magnetic recording head 630, the first layer 686 and the second layer 688 both surround the second surface 352b, the third surface 352c, and the fourth surface 352d of the second main pole 352. The second layer 688 may comprise a magnetic material, such as CoFe, CoIr, NiFe, or a CoFeX alloy, where X=B, Ta, Re, or Ir. The second layer 688 may have a thickness between about 2 nm to about 10 nm, such as about 5 nm.

In the second write head 350 of the magnetic recording head 640 of FIG. 6C, the second layer 688 of the SS 662 comprises a first portion 688a, a second portion 688b, and a third portion 688c. The second layer 688 in the magnetic recording head 640 of FIG. 6C is discontinuous, as compared to the continuous second layer 688 in the magnetic recording head 630 of FIG. 6B. The first portion 688a of the second layer 688 is disposed adjacent to the first side gap 368a and the second surface 352b of the second main pole 352, the second portion 688b of the second layer 688 is disposed adjacent to the second side gap 368b and the third surface 352c of the second main pole 352, and the third portion 688c of the second layer 688 is disposed adjacent to the second leading gap 364 and the fourth surface 352d of the second main pole 352. The third portion 688c of the second layer 688 is disposed on and in contact with the leading shield 636. Thus, in the magnetic recording head 640, the first layer 686 and the second layer 688 both surround the second surface 352b, the third surface 352c, and the fourth surface 352d of the second main pole 352.

In the second write head 350 of the magnetic recording head 640 of FIG. 6C, the first portion 688a and the second portion 688b of the second layer 688 may comprise the same material while the third portion 688c comprises a different material than the first and second portions 688a, 688b. The first portion 688a and the second portion 688b of the second layer 688 may each comprise a magnetic material, such as CoFe, CoIr, NiFe, or a CoFeX alloy, where X=B, Ta, Re, or Ir. The third portion 688c of the second layer 688 may also comprise a magnetic material, such as CoFe, CoIr, NiFe, or a CoFeX alloy, where X=B, Ta, Re, or Ir, so long as the material of the third portion 688c is different than the material of the first and second portions 688a, 688b. In one embodiment, each of the first, second, and third portions 688a-588c comprise a different magnetic material. The first portion 688a, the second portion 688b, and the third portion 688c of the second layer 688 may each have the same thickness. The first portion 688a, the second portion 688b, and the third portion 688c of the second layer 688 may each have a thickness between about 2 nm to about 10 nm, such as about 6 nm.

Figure 7:
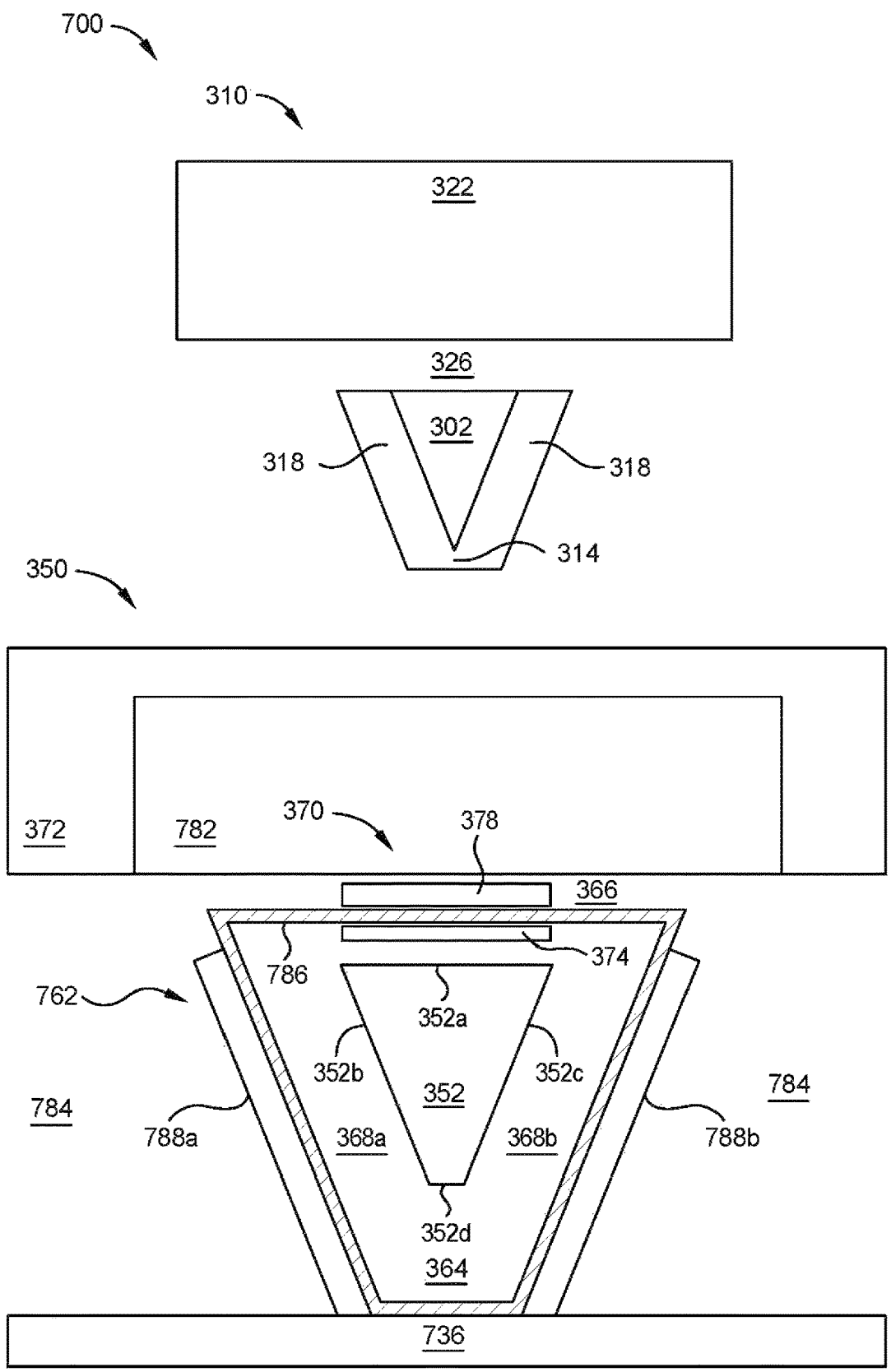
FIG. 7 illustrates an MFS view of a magnetic recording head comprising a first write head and a second write head having a virtual side shield, according to yet another embodiment.

FIG. 7 illustrates an MFS view of a magnetic recording head 700 comprising a first write head 310 and a second write head 350 having a virtual side shield 762, according to one embodiment. The magnetic recording head 700 may correspond to the magnetic head assembly 121 described in FIG. 1, the read/write heads 200 and 290 described in FIGS. 2A-2B, and/or the magnetic recording head 300 described in FIGS. 3A-3J. The magnetic recording head 700 comprises a first write head 310 and a second write head 350. The first and second write heads 310, 350 of the magnetic recording head 700 may be the first and second write heads 310, 350, respectively, of FIGS. 3A-3E. While the first and second write heads 310, 350 are shown in a side-by-side formation, the first and second write heads 310, 350 may be disposed in a stacked formation, like shown in FIG. 3E. The first write head 310 may be a HAMR write head comprising a HAMR element or a conventional write head. For consistency, the first write head 310 and elements of the second write head 350 are labeled with the same numerals as FIGS. 3A-3E.

The second write head 350 comprises the second main pole 352, the second trailing shield 372 disposed above the second main pole 352, and an EAMR stack 370 disposed between the second main pole 352 and the second trailing shield 372 in the second trailing gap 366. The EAMR stack 370 may be a SOT structure or a STT structure, such as any of the structures shown and described in FIGS. 3D-3J. The second trailing shield 372 comprises a hot seed layer 782. The second trailing shield 372 may comprise NiFe and the hot seed layer 782 may comprise a high moment material, such as CoFeN or FeXN, where X includes at least one of Rh, Al, Ta, Zr, and Ti. While not shown, the first trailing shield 322 of the first write head 310 may also comprise a hot seed layer.

The second write head 350 comprises a virtual SS 762 while the first write head 310 does not comprise a side shield. The SS 762 surrounds the first surface 352a, the second surface 352b, the third surface 352c, and the fourth surface 352d of the second main pole 352. The SS 762 comprises a first layer 786 and a second layer 788. The magnetic recording head 700 of FIG. 7 is similar to the magnetic recording head 400 of FIG. 4; however, the first layer 786 of the SS 762 surrounds the first surface 352a, the second surface 352b, the third surface 352c, and the fourth surface 352d of the second main pole 352. The first layer 786 is disposed in the second trailing gap 366 between the second trailing shield 372 and the second main pole 352, in the second leading gap 364 between the second main pole 352 and a leading shield 736, and adjacent to the first side gap 368a and the second side gap 368b. A portion of the first layer 786 disposed below the second leading gap 364 is disposed on and in contact with the leading shield 736. A portion of the first layer 786 may function as a layer of the EAMR stack 370, and may be the heavy metal layer or topological insulator layer 376 of FIGS. 3D-3E or the first spin Hall layer 381 of FIG. 3I. The EAMR stack 370 comprises the first STL 374 and the second STL 378 discussed in FIGS. 3D-3E.

The second layer 788 of the SS 762 comprises a first portion 788a and a second portion 788b. The first portion 788a of the second layer 788 is disposed adjacent to the first side gap 368a or the second surface 352b of the second main pole 352, and the second portion 788b of the second layer 788 is disposed adjacent to the second side gap 368b or the third surface 352c of the second main pole 352. The second layer 788 is in contact with the first layer 786, and the first layer 786 is disposed between the second layer 788 and the second main pole 352. A portion of the second layer 788 disposed adjacent to the second leading gap 364 is disposed on and in contact with the leading shield 736. The second layer 788 may function as an STL or comprise the same material as the first and second STLs 374, 378. An insulating material 784 may be disposed adjacent to the second layer 788 of the SS 762, such as alumina.

The first layer 786 comprises a heavy metal material, such as beta phase tungsten (β-W), platinum (Pt), beta phase tantalum (β-Ta), or a topological insulator material, such as BiSb, TeBiSb, TeBi, TeSb. Other heavy metal materials that can be used include Hf, WHf, WIr, Bi doped with Cu, FeMn, PfMn, IrMn, and other suitable materials. The first layer 786 may have a thickness between about 2 nm to about 20 nm, such as about 6 nm. The second layer 788 comprises a magnetic material, such as CoFe, Coir, NiFe, or a CoFeX alloy, where X=B, Ta, Re, or Ir. The second layer 788 may have a thickness between about 2 nm to about 10 nm, such as about 6 nm. The first layer 786 and the second layer 788 of the virtual SS 762 may together have a total thickness between about 4 nm to about 30 nm.

[moo] In one embodiment, the EAMR stack 370 may contact the first surface 352a of the second main pole 352 (i.e., the trailing side), or a nickel oxide layer may be disposed between the first surface 352a of the second main pole 352 and the EAMR stack 370. In another embodiment, a YIG layer may be disposed between the second main pole 352 and the EAMR stack 370. When current (I) is applied to the second write head 350 of the magnetic recording head 700, the current flows through the first layer 786 comprising a heavy metal material. Due to the spin Hall effect in the first layer 786, the spins accumulated on the surface of the first layer 786 can switch the second layer 788 and the EAMR stack 370. The switching of the virtual SS 762 and the EAMR stack 370 may be controlled by the current magnitude flowing in the first layer 786.

Figure 8:
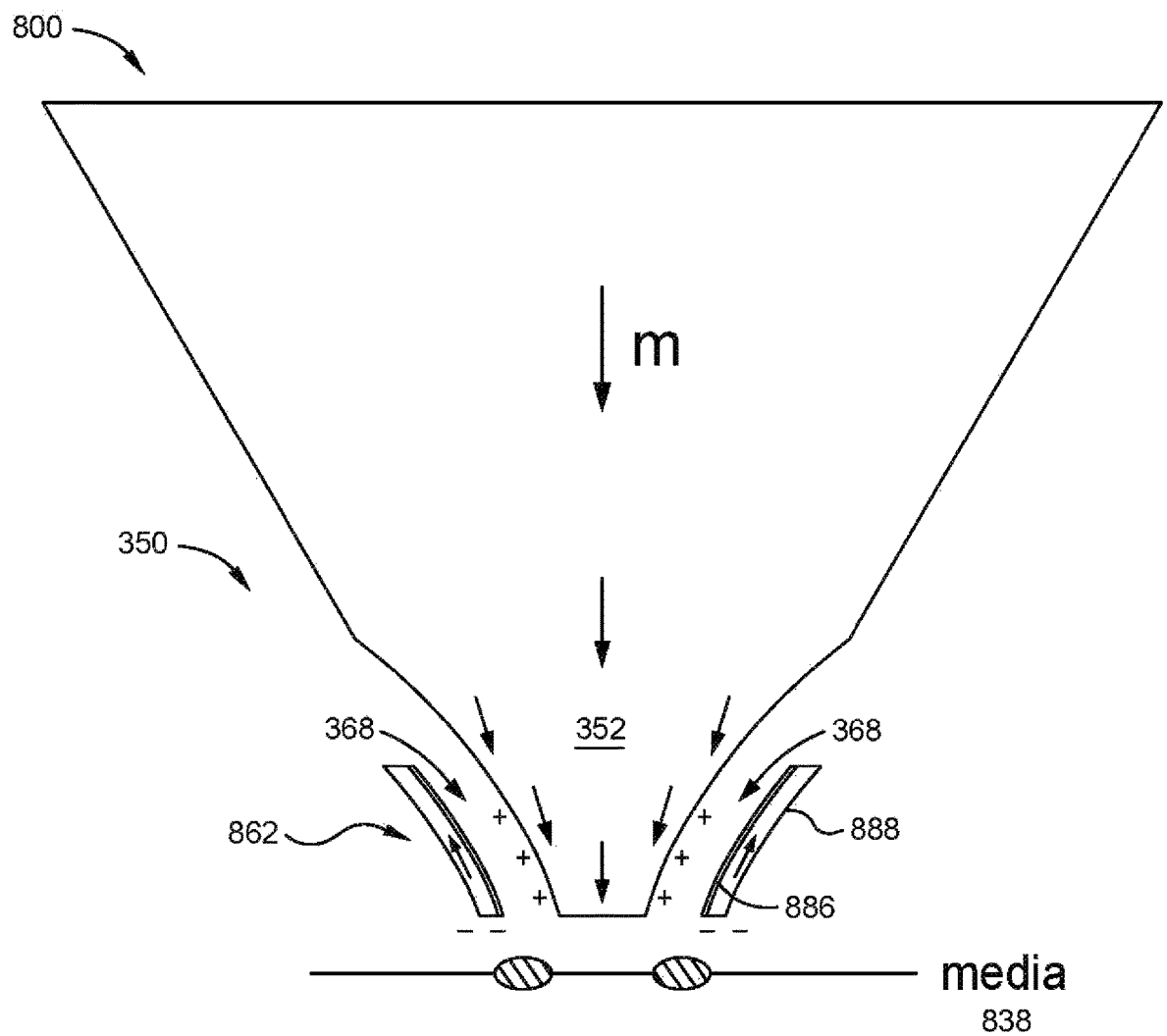
FIG. 8 illustrates a cross-sectional view of a magnetic recording head illustrating the effects of a virtual side shield, according to one embodiment.

FIG. 8 illustrates a cross-sectional view of an exemplary magnetic recording head 800 illustrating the effects a virtual side shield 862, according to one embodiment. The magnetic recording head 800 may correspond to the magnetic head assembly 121 described in FIG. 1, the read/write heads 200 and 290 described in FIGS. 2A-2B, and/or the magnetic recording head 300 described in FIGS. 3A-3J, the magnetic recording head 400 described in FIG. 4, the magnetic recording head 500 described in FIG. 5, the magnetic recording head 600 described in FIG. 6A, the magnetic recording head 630 described in FIG. 6B, the magnetic recording head 640 described in FIG. 6C, and/or the magnetic recording head 700 described in FIG. 7. While only the second write head 350 is shown, the magnetic recording head 800 further comprises the first write head 310 of FIGS. 3A-3E, and the first and second write heads 310, 350 may be disposed in either a stacked formation or a side-by-side formation. The first write head 310 may be a HAMR write head comprising a HAMR element or a conventional write head.

The second write head 350 comprises the second main pole 352 disposed above a media 838 and a virtual SS 862 comprising a first layer 886 and a second layer 888. The virtual SS 862 surrounds at least two surfaces of the second main pole 352. The configuration of the first layer 886 and the second layer 888 of the SS 862 may be like the corresponding layers of the SS 462 of FIG. 4, the SS 562 of FIG. 5, the SS 662 of FIGS. 6A-6C, or the SS 762 of FIG. 7. The second write head 350 of the magnetic recording head 800 may comprise other elements not shown in FIG. 8, such as a second trailing shield and an EAMR stack.

As shown in FIG. 8, when a bias current is applied to the first layer 886, the second layer 888 can be switched with a magnetization direction opposite to the magnetization direction in the second main pole 352. As a result, the charges coming off the second main pole 352 cancel out the charges coming off the SS 862 at the media 838. Thus, adjacent tracks on the media 838 are no longer erased. Moreover, no undesirable magnetic shunting occurs in the side gaps 368. The magnetic recording head 800 has an increased BPI and overwrite capability as compared to conventional magnetic recording devices. The magnetic recording head 800 further experiences a similar TPI and adjacent track interference (ATI) as a conventional magnetic recording device, and has an improved ADC as compare to conventional magnetic recording devices.

Utilizing a virtual side shield in one write head of a dual write head magnetic recording device, like shown in FIGS. 4-8, eliminates undesirable magnetic shunting and prevents erasure of adjacent tracks on a media when writing to the media. The heavy metal or topological insulator layer of the virtual side shield is able to shunt some stray write field without shunting the write field form the main pole, enhancing the overall performance of the magnetic write head. As such, the above-described dual write head design comprising one write head having a virtual side shield results in the magnetic recording device having increased ADC, BPI, TPI, and overwrite capabilities without sacrificing ATI capabilities.

Moreover, a magnetic recording head having a first coil of a first write head wrapping around a first longer yoke of the first write head the same or a greater number of times than the second coil of the second write head wraps around a second shorter yoke of the second write allows the first write head to have a stronger write field and allows the second write head to have a higher data rate. As such, the first write head is optimized to increase a BPI capability of the magnetic recording head, and the second write head is optimized to increase a TPI capability of the magnetic recording head.

Therefore, by utilizing a magnetic recording head comprising a first writing head configured to optimize the BPI and a second writing head configured to optimize the TPI, tracks of a media may be randomly written without limiting the SNR, without ATI/FTI constraints, and without suffering reading track edge curvature. Thus, the dual write head design discussed above has an increased ADC, BPI, and TPI as compared to conventional magnetic recording heads comprising a single write head, resulting in both improved writes and reads of data on a media.

In one embodiment, a magnetic recording head comprises a first write head comprising a first main pole, and a second write head disposed adjacent to the first write head. The second write head comprises a second main pole having a first surface adjacent to a trailing gap, a second surface adjacent to the first surface, a third surface opposite the second surface, and a fourth surface adjacent to a leading gap, a side shield surrounding one or more of the first surface, the second surface, the third surface, and the fourth surface of the second main pole, including at least one of the second surface and the third surface, wherein the side shield comprises a first layer comprising a heavy metal material or a topological insulator material and a second layer comprising a magnetic material, and an EAMR structure disposed on the second main pole at a media facing surface.

A first portion of the first layer of the side shield is disposed in the trailing gap adjacent to the first surface of the second main pole, and the first portion of the first layer forms part of the EAMR structure. The EAMR structure comprises a spin orbital torque structure. The EAMR structure comprises a spin transfer torque structure. The second write head further comprises a non-magnetic conductive structure disposed between the second main pole and the side shield, wherein the non-magnetic conductive structure is in contact with the EAMR structure, and wherein the non-magnetic conductive structure comprises a material selected from the group consisting of NiTa, Cr, Cu, and Rh, or a multilayer stack selected from the group consisting of NiTa/Ru, Cr/Cu, and Cr/Rh. The first write head is a heat assisted magnetic recording head. The first write head further comprises a first yoke coupled to the first main pole, the first yoke having a first length, and wherein the second write head further comprises a second yoke coupled to the second main pole, the second yoke having a second length less than the first length of the first yoke.

In another embodiment, a magnetic recording head comprises a first write head comprising a first main pole having a first length and a first width, and a second write head disposed adjacent to the first write head. The second write head comprises a second main pole having a second length and a second width, wherein the second length is greater than the first length of the first main pole and the second width is less than the first width of the first main pole. The magnetic recording head further comprises an EAMR structure disposed on the second main pole at a media facing surface, and a non-magnetic conductive structure surrounding at least a portion of the second main pole, wherein the non-magnetic conductive structure is in contact with the EAMR structure.

The second write head further comprises a side shield surrounding two or more surfaces of the second main pole, wherein the side shield comprises a first layer comprising a heavy metal material or a topological insulator material and a second layer comprising a magnetic material, wherein the first layer comprises beta phase tungsten ($\beta$-W), Pt, or beta phase tantalum ($\beta$-Ta), and wherein the second layer comprises CoFe, Coir, NiFe, or a CoFeX alloy, where X=B, Ta, Re, or Ir. The EAMR structure comprises a spin orbit torque structure or a spin transfer torque structure. The non-magnetic conductive structure comprises a material selected from the group consisting of NiTa, Cr, Cu, and Rh, or a multilayer stack selected from the group consisting of NiTa/Ru, Cr/Cu, and Cr/Rh. The first write head further comprises a first yoke coupled to the first main pole, the first yoke having a first length, a first coil wrapped around the first yoke, and a laser, wherein the second write head further comprises a second yoke coupled to the second main pole, the second yoke having a second length less than the first length of the first yoke, and a second coil, and wherein the first coil wraps around the first yoke a greater number of times than the second coil wraps around the second yoke. A write of the first write head is wider than that of the second write head, wherein the second write head has a higher data rate than the first write head, and wherein the first write head has a greater write field than the second write head.

In yet another embodiment, a magnetic recording head comprises a first write head comprising a first main pole, a first yoke coupled to the first main pole, the first yoke having a first length, and a first coil wrapped around the first yoke.

The magnetic recording head further comprises a second write head disposed adjacent to the first write head comprising a second main pole, an EAMR structure disposed on the second main pole at a media facing surface, a side shield surrounding a first surface, a second surface, and a third surface of the second main pole, a second yoke coupled to the second main pole, the second yoke having a second length equal to or less than the first length of the first yoke, and a second coil, wherein the first coil wraps around the first yoke a greater number of times than the second coil wraps around the second yoke.

The first write head comprises a heat assisted magnetic recording element. The side shield comprises a first layer surrounding the first surface, the second surface, and the third surface of the second main pole, the first surface of the second main pole being disposed adjacent to a trailing gap, and a second layer surrounding at least the second surface and the third surface of the main pole, wherein the first layer comprises a heavy metal material or a topological insulator material and the second layer comprises a magnetic material, and wherein a first portion of the first layer of the side shield disposed in the trailing gap forms a portion of the EAMR structure. The first surface of the second main pole disposed adjacent to a trailing gap, and wherein the second surface and the third surface are disposed adjacent to the first surface in a side gap. The first surface of the second main pole disposed adjacent to a trailing gap, and wherein the second surface and the third surface are disposed adjacent to the first surface in a side gap. The second write head further comprises a non-magnetic conductive structure disposed between the second main pole and the side shield and in contact with the EAMR structure. The EAMR structure comprises a spin orbit torque structure or a spin transfer torque structure, and wherein a write of the first write head is wider than that of the second write head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a first write head, comprising:
   a first main pole; and
   a second write head disposed adjacent to the first write head, comprising:
   a second main pole having a first surface adjacent to a trailing gap, a second surface adjacent to the first surface, a third surface opposite the second surface, and a fourth surface adjacent to a leading gap;
   a side shield surrounding one or more of the first surface, the second surface, the third surface, and the fourth surface of the second main pole, including at least one of the second surface and the third surface, wherein the side shield comprises a first layer comprising a heavy metal material or a topological insulator material, and a second layer comprising a magnetic material, wherein a first surface of the first layer is disposed in contact with a non-magnetic side gap, and a second surface of the first layer opposite the first surface of the first layer is disposed in contact with the second layer; and
   an energy-assisted magnetic recording (EAMR) structure disposed on the second main pole at a media facing surface.

2. The magnetic recording head of claim 1, wherein a first portion of the first layer of the side shield is disposed in the trailing gap adjacent to the first surface of the second main pole, and wherein the first portion of the first layer forms part of the EAMR structure.

3. The magnetic recording head of claim 1, wherein the EAMR structure comprises a spin orbital torque structure.

4. The magnetic recording head of claim 1, wherein the first write head is a heat assisted magnetic recording head.

5. The magnetic recording head of claim 1, wherein the first write head further comprises a first yoke coupled to the first main pole, the first yoke having a first length, and wherein the second write head further comprises a second yoke coupled to the second main pole, the second yoke having a second length less than the first length of the first yoke.

6. A data storage device comprising the magnetic recording head of claim 1.

7. The magnetic recording head of claim 1, wherein the first layer of the side shield surrounds the first, second, third, and fourth surfaces of the second main pole, and wherein the second layer of the side shield is disposed around the second and third surfaces of the second main pole.

8. The magnetic recording head of claim 1, wherein the first layer of the side shield has a first thickness and the second layer of the side shield has a second thickness greater than the first thickness.

9. A magnetic recording head, comprising:
   a first write head, comprising:
   a first main pole;
   a first yoke coupled to the first main pole, the first yoke having a first length; and
   a first coil wrapped around the first yoke; and
   a second write head disposed adjacent to the first write head, comprising:
   a second main pole;
   an EAMR structure disposed on the second main pole at a media facing surface;
   a side shield surrounding a first surface, a second surface, and a third surface of the second main pole, the side shield comprising a first layer comprising a heavy metal material or a topological insulator material and a second layer comprising a magnetic material, and wherein a first surface of the first layer is disposed in contact with a non-magnetic side gap, and a second surface of the first layer opposite the first surface of the first layer is disposed in contact with the second layer;
   a second yoke coupled to the second main pole, the second yoke having a second length equal to or less than the first length of the first yoke; and
   a second coil, wherein the first coil wraps around the first yoke a greater number of times than the second coil wraps around the second yoke.

10. The magnetic recording head of claim 9, wherein the first write head comprises a heat assisted magnetic recording element.

11. The magnetic recording head of claim 9, wherein the first layer surrounds at least the first surface, the second surface, and the third surface of the second main pole, the first surface of the second main pole being disposed adjacent to a trailing gap, and the second layer surrounds at least the second surface and the third surface of the main pole, layer of the side shield disposed in the trailing gap forms a portion of the EAMR structure.

12. The magnetic recording head of claim 11, wherein the second surface of the second main pole and the third surface of the second main pole are disposed adjacent to the first surface of the second main pole in a side gap.

13. The magnetic recording head of claim 9, wherein the first surface of the second main pole is disposed adjacent to a leading gap, and wherein the second surface and the third surface are disposed adjacent to the first surface in a side gap.

14. The magnetic recording head of claim 9, wherein the EAMR structure comprises a spin orbit torque structure or a spin transfer torque structure, and wherein a width of the first write head is wider than that of the second write head.

15. A data storage device comprising the magnetic recording head of claim 9.

16. The magnetic recording head of claim 9, wherein the first layer of the side shield has a first thickness and the second layer of the side shield has a second thickness greater than the first thickness.

17. A magnetic recording head, comprising:
a first write head, comprising:
a first main pole; and
a second write head disposed adjacent to the first write head, comprising:
a second main pole comprising a first surface, a second surface, a third surface, and a fourth surface;
an EAMR structure disposed over the first surface of the second main pole at a media facing surface;
one or more non-magnetic side gaps in contact with the second and third surfaces of the second main pole; and
a side shield surrounding the first, second, third, and fourth surfaces of the second main pole, the side shield comprising a first layer having a first thickness, the first layer comprising a heavy metal material or a topological insulator material, and a second layer comprising a magnetic material having a second thickness greater than the first thickness, wherein a first surface of the first layer is disposed in contact with the one or more non-magnetic side gaps, and a second surface of the first layer opposite the first surface of the first layer is disposed in contact with the second layer.

18. The magnetic recording head of claim 17, wherein the first layer of the side shield surrounds the first, second, third, and fourth surfaces of the second main pole, and wherein the second layer of the side shield is disposed around the second and third surfaces of the second main pole.

19. The magnetic recording head of claim 17, wherein the EAMR structure comprises a spin orbit torque structure or a spin transfer torque structure, and wherein the first write head comprises a heat assisted magnetic recording element.

20. The magnetic recording head of claim 17, wherein the second write head further comprises an insulating material disposed in contact with the second layer of the side shield.

21. The magnetic recording head of claim 17, wherein a first portion of the first layer of the side shield is disposed in a trailing gap adjacent to the first surface of the second main pole, and wherein the first portion of the first layer forms part of the EAMR structure.

22. The magnetic recording head of claim 17, wherein the first write head further comprises a first yoke coupled to the first main pole, the first yoke having a first length,
wherein the second write head further comprises a second yoke coupled to the second main pole, the second yoke having a second length less than the first length of the first yoke,
wherein the first write head further comprises a first coil wrapped around the first yoke, the first coil having a first length,
wherein the second write head further comprises a second coil wrapped around the second main pole, the second coil having a second length less than the first length of the first coil, and
wherein a width of the first write head is wider than that of the second write head.

23. A data storage device comprising the magnetic recording head of claim 17.

* * * * *